US008147325B2

(12) United States Patent
Kane et al.

(10) Patent No.: US 8,147,325 B2
(45) Date of Patent: Apr. 3, 2012

(54) SYSTEMS AND METHODS FOR PLAYING GAMES OF CHANCE OR SKILL USING AN ALTERNATE METHOD OF ENTRY

(75) Inventors: Steven N. Kane, Brookline, MA (US); Dow Hardy, Marlborough, MA (US); Mark E. Herrmann, Wellesley, MA (US); Paul LaRocca, Westport, CT (US); Stuart Roseman, Boston, MA (US); Bijan Sabet, Sudbury, MA (US); Jason Yanowitz, Amherst, MA (US)

(73) Assignee: Scientific Games Holdings Limited, Ballymahon, Co. Longford (IE)

( * ) Notice: Subject to any disclaimer, the term of this patent is extended or adjusted under 35 U.S.C. 154(b) by 698 days.

(21) Appl. No.: 11/049,399

(22) Filed: Feb. 2, 2005

(65) Prior Publication Data

US 2005/0208989 A1 Sep. 22, 2005

Related U.S. Application Data

(63) Continuation-in-part of application No. 10/728,727, filed on Dec. 5, 2003.

(60) Provisional application No. 60/431,036, filed on Dec. 5, 2002.

(51) Int. Cl.
*A63F 13/00* (2006.01)

(52) U.S. Cl. .................. 463/29; 463/9; 463/10; 463/16; 463/17; 463/18; 463/20; 463/25; 463/26; 463/27; 463/42

(58) Field of Classification Search .............. 463/13–20, 463/25–29, 40–43, 9–10; 700/90–91
See application file for complete search history.

(56) References Cited

U.S. PATENT DOCUMENTS

| | | | |
|---|---|---|---|
| 2,544,961 | A | 3/1951 | Kemp |
| 4,215,864 | A | 8/1980 | Nichols |
| 5,297,802 | A | 3/1994 | Pocock et al. |
| 5,333,868 | A | 8/1994 | Goldfarb |
| 5,351,970 | A | 10/1994 | Fioretti |
| 5,429,361 | A | 7/1995 | Raven |
| 5,518,253 | A | 5/1996 | Pocock et al. |
| 5,569,083 | A | 10/1996 | Fioretti |
| 5,679,077 | A | 10/1997 | Pocock et al. |
| 5,709,603 | A | 1/1998 | Kaye et al. |
| 5,772,511 | A | 6/1998 | Smeltzer et al. |

(Continued)

FOREIGN PATENT DOCUMENTS

CA 2338080 A1 9/2001

(Continued)

OTHER PUBLICATIONS http://www.powerball.com/powerball/pb_howtoplay.asp, accessed Sep. 14, 2008, All.

(Continued)

*Primary Examiner* — Sunit Pandya
(74) *Attorney, Agent, or Firm* — Dority & Manning, P.A.

(57) ABSTRACT

The present invention relates to methods of and systems for playing tournament-style games, such as the World Series of Poker, and other games of skill or chance. The present invention additionally is systems and methods for using an alternate method of entry to enable a player to participate in a wagering game of skill or chance.

21 Claims, 13 Drawing Sheets

U.S. PATENT DOCUMENTS

| | | | | |
|---|---|---|---|---|
| 5,779,549 | A * | 7/1998 | Walker et al. | 463/42 |
| 5,782,470 | A | 7/1998 | Langan | |
| 5,791,990 | A | 8/1998 | Schroeder et al. | |
| 5,791,991 | A | 8/1998 | Small | |
| 5,816,918 | A | 10/1998 | Kelly et al. | |
| 5,857,911 | A | 1/1999 | Fioretti | |
| 5,935,002 | A | 8/1999 | Falciglia | |
| 5,954,582 | A | 9/1999 | Zach et al. | |
| 6,012,983 | A | 1/2000 | Walker et al. | |
| 6,012,984 | A | 1/2000 | Roseman | |
| 6,015,344 | A | 1/2000 | Kelly et al. | |
| 6,024,640 | A | 2/2000 | Walker et al. | |
| 6,077,163 | A | 6/2000 | Walker et al. | |
| 6,113,495 | A | 9/2000 | Walker et al. | |
| 6,168,521 | B1 | 1/2001 | Luciano et al. | |
| 6,186,892 | B1 | 2/2001 | Frank et al. | |
| 6,203,011 | B1 | 3/2001 | Nulph et al. | |
| 6,241,606 | B1 | 6/2001 | Riendeau et al. | |
| 6,244,957 | B1 | 6/2001 | Walker et al. | |
| 6,244,958 | B1 | 6/2001 | Acres et al. | |
| 6,280,325 | B1 * | 8/2001 | Fisk | 463/19 |
| 6,302,793 | B1 | 10/2001 | Fertitta et al. | |
| 6,319,127 | B1 | 11/2001 | Walker et al. | |
| 6,364,765 | B1 | 4/2002 | Walker et al. | |
| 6,364,766 | B1 | 4/2002 | Anderson | |
| 6,371,852 | B1 | 4/2002 | Acres | |
| 6,390,921 | B1 | 5/2002 | Busch et al. | |
| 6,439,995 | B1 | 8/2002 | Hughs-Baird et al. | |
| 6,523,829 | B1 | 2/2003 | Walker et al. | |
| 6,540,230 | B1 | 4/2003 | Walker et al. | |
| 6,565,435 | B2 | 5/2003 | Metke | |
| 6,572,106 | B2 | 6/2003 | Alexoff et al. | |
| 6,581,935 | B1 | 6/2003 | Odom | |
| 6,585,590 | B2 | 7/2003 | Malone | |
| 6,599,192 | B1 | 7/2003 | Baerlocher et al. | |
| 6,607,439 | B2 | 8/2003 | Scheneier et al. | |
| 6,612,928 | B1 * | 9/2003 | Bradford et al. | 463/29 |
| 6,620,046 | B2 | 9/2003 | Rowe | |
| 6,634,942 | B2 | 10/2003 | Walker et al. | |
| 6,679,497 | B2 | 1/2004 | Walker et al. | |
| 6,692,353 | B2 | 2/2004 | Walker et al. | |
| 6,761,633 | B2 | 7/2004 | Riendeau et al. | |
| 6,780,108 | B1 | 8/2004 | Luciano et al. | |
| 6,800,030 | B2 * | 10/2004 | Acres | 463/25 |
| 6,843,724 | B2 | 1/2005 | Walker et al. | |
| 6,852,031 | B1 | 2/2005 | Rowe et al. | |
| 6,910,968 | B2 | 6/2005 | Nassef et al. | |
| 6,929,544 | B2 | 8/2005 | Osterer | |
| 6,964,611 | B2 | 11/2005 | Packes et al. | |
| 6,969,317 | B2 | 11/2005 | Walker et al. | |
| 6,969,319 | B2 | 11/2005 | Rowe et al. | |
| 7,008,318 | B2 | 3/2006 | Schneier et al. | |
| 7,052,394 | B2 | 5/2006 | Walker et al. | |
| 7,118,478 | B2 | 10/2006 | Fayter et al. | |
| 7,140,964 | B2 | 11/2006 | Walker et al. | |
| 7,156,739 | B2 | 1/2007 | Walker et al. | |
| 7,163,459 | B2 | 1/2007 | Tanskanen et al. | |
| 7,172,506 | B2 | 2/2007 | Baerlocher et al. | |
| 7,179,168 | B1 | 2/2007 | Tulley et al. | |
| 7,275,990 | B2 | 10/2007 | Walker et al. | |
| 7,285,045 | B2 | 10/2007 | Schneier et al. | |
| 7,294,058 | B1 | 11/2007 | Slomiany et al. | |
| 7,303,468 | B2 | 12/2007 | Schneier et al. | |
| 7,303,470 | B2 | 12/2007 | George et al. | |
| 2001/0004609 | A1 | 6/2001 | Walker et al. | |
| 2001/0031654 | A1 | 10/2001 | Walker et al. | |
| 2001/0046891 | A1 | 11/2001 | Acres | |
| 2002/0010015 | A1 | 1/2002 | Acres | |
| 2002/0039923 | A1 | 4/2002 | Cannon et al. | |
| 2002/0042300 | A2 | 4/2002 | Acres et al. | |
| 2002/0052231 | A1 | 5/2002 | Fioretti | |
| 2002/0090986 | A1 | 7/2002 | Cote et al. | |
| 2002/0090987 | A1 | 7/2002 | Walker et al. | |
| 2002/0094860 | A1 | 7/2002 | Itkis et al. | |
| 2002/0098883 | A1 | 7/2002 | Packes et al. | |
| 2002/0107072 | A1 | 8/2002 | Giobbi et al. | |
| 2002/0111207 | A1 | 8/2002 | Lind et al. | |
| 2002/0147040 | A1 | 10/2002 | Walker et al. | |
| 2002/0151358 | A1 | 10/2002 | Walker et al. | |
| 2002/0152120 | A1 | 10/2002 | Howington et al. | |
| 2002/0196342 | A1 | 12/2002 | Walker et al. | |
| 2003/0003988 | A1 | 1/2003 | Walker et al. | |
| 2003/0013531 | A1 | 1/2003 | Rowe et al. | |
| 2003/0032473 | A1 | 2/2003 | Rowe et al. | |
| 2003/0032476 | A1 | 2/2003 | Walker et al. | |
| 2003/0047869 | A1 | 3/2003 | Walker et al. | |
| 2003/0114217 | A1 | 6/2003 | Walker et al. | |
| 2003/0155715 | A1 | 8/2003 | Walker et al. | |
| 2003/0157977 | A1 | 8/2003 | Thomas et al. | |
| 2003/0171986 | A1 | 9/2003 | Itkis et al. | |
| 2003/0176210 | A1 | 9/2003 | Vancura et al. | |
| 2003/0199318 | A1 | 10/2003 | Nassef et al. | |
| 2003/0218303 | A1 | 11/2003 | Walker et al. | |
| 2003/0220138 | A1 | 11/2003 | Walker et al. | |
| 2003/0228901 | A1 | 12/2003 | Walker et al. | |
| 2004/0014514 | A1 | 1/2004 | Yacenda | |
| 2004/0038733 | A1 | 2/2004 | Walker et al. | |
| 2004/0092307 | A1 | 5/2004 | George et al. | |
| 2004/0106449 | A1 | 6/2004 | Walker et al. | |
| 2004/0142741 | A1 | 7/2004 | Walker et al. | |
| 2004/0147308 | A1 | 7/2004 | Walker et al. | |
| 2004/0180722 | A1 | 9/2004 | Giobbi et al. | |
| 2004/0185930 | A1 | 9/2004 | Thomas et al. | |
| 2004/0192432 | A1 | 9/2004 | Walker et al. | |
| 2004/0192434 | A1 | 9/2004 | Walker et al. | |
| 2004/0214628 | A1 | 10/2004 | Boyd et al. | |
| 2004/0214629 | A1 | 10/2004 | Walker et al. | |
| 2004/0229671 | A1 | 11/2004 | Stronach et al. | |
| 2004/0235551 | A1 | 11/2004 | Walker et al. | |
| 2004/0259631 | A1 | 12/2004 | Katz et al. | |
| 2005/0037841 | A1 | 2/2005 | de Waal | |
| 2005/0049042 | A1 | 3/2005 | Walker et al. | |
| 2005/0064926 | A1 | 3/2005 | Walker et al. | |
| 2005/0085294 | A1 | 4/2005 | Walker et al. | |
| 2005/0085295 | A1 | 4/2005 | Walker et al. | |
| 2005/0090314 | A1 | 4/2005 | Nassef, Jr. et al. | |
| 2005/0124407 | A1 | 6/2005 | Rowe et al. | |
| 2005/0170881 | A1 | 8/2005 | Muskin | |
| 2005/0187005 | A1 | 8/2005 | Rose et al. | |
| 2005/0282619 | A1 | 12/2005 | Vancura et al. | |
| 2005/0282626 | A1 | 12/2005 | Manfredi et al. | |
| 2005/0288088 | A1 | 12/2005 | Englman et al. | |
| 2006/0009275 | A1 | 1/2006 | Packes et al. | |
| 2006/0025206 | A1 | 2/2006 | Walker et al. | |
| 2006/0025207 | A1 | 2/2006 | Walker et al. | |
| 2006/0025209 | A1 | 2/2006 | Walker et al. | |
| 2006/0025219 | A1 | 2/2006 | Nassef, Jr. et al. | |
| 2006/0035696 | A1 | 2/2006 | Walker et al. | |
| 2006/0035697 | A1 | 2/2006 | Packes et al. | |
| 2006/0035701 | A1 | 2/2006 | Walker et al. | |
| 2006/0036450 | A1 | 2/2006 | Nassef, Jr. et al. | |
| 2006/0040725 | A1 | 2/2006 | Walker et al. | |
| 2006/0040730 | A1 | 2/2006 | Walker et al. | |
| 2006/0041586 | A1 | 2/2006 | Nassef, Jr. et al. | |
| 2006/0043668 | A1 | 3/2006 | Walker et al. | |
| 2006/0046835 | A1 | 3/2006 | Walker et al. | |
| 2006/0046836 | A1 | 3/2006 | Walker et al. | |
| 2006/0046841 | A1 | 3/2006 | Walker et al. | |
| 2006/0068872 | A1 | 3/2006 | Walker et al. | |
| 2006/0068893 | A1 | 3/2006 | Jaffe et al. | |
| 2006/0068903 | A1 | 3/2006 | Walker et al. | |
| 2006/0073884 | A1 | 4/2006 | Walker et al. | |
| 2006/0079309 | A1 | 4/2006 | Walker et al. | |
| 2006/0079321 | A1 | 4/2006 | Walker et al. | |
| 2006/0084501 | A1 | 4/2006 | Walker et al. | |
| 2006/0089194 | A1 | 4/2006 | Joshi et al. | |
| 2006/0089195 | A1 | 4/2006 | Walker et al. | |
| 2006/0105836 | A1 | 5/2006 | Walker et al. | |
| 2006/0111175 | A1 | 5/2006 | Walker et al. | |
| 2006/0121972 | A1 | 6/2006 | Walker et al. | |
| 2006/0148549 | A1 | 7/2006 | Walker et al. | |
| 2006/0148562 | A1 | 7/2006 | Walker et al. | |
| 2006/0160599 | A1 | 7/2006 | Tulley et al. | |
| 2006/0172794 | A1 | 8/2006 | Walker et al. | |
| 2006/0178187 | A1 | 8/2006 | Walker et al. | |
| 2006/0189371 | A1 | 8/2006 | Walker et al. | |
| 2006/0194631 | A1 | 8/2006 | Rowe et al. | |

| | | | |
|---|---|---|---|
| 2006/0205511 | A1 | 9/2006 | Thomas et al. |
| 2006/0208868 | A1 | 9/2006 | Walker et al. |
| 2006/0208869 | A1 | 9/2006 | Walker et al. |
| 2006/0211470 | A1 | 9/2006 | Walker et al. |
| 2006/0211471 | A1 | 9/2006 | Walker et al. |
| 2006/0211478 | A1 | 9/2006 | Walker et al. |
| 2006/0217174 | A1 | 9/2006 | Walker et al. |
| 2006/0217177 | A1 | 9/2006 | Walker et al. |
| 2006/0217189 | A1 | 9/2006 | Walker et al. |
| 2006/0217190 | A1 | 9/2006 | Walker et al. |
| 2006/0223628 | A1 | 10/2006 | Walker et al. |
| 2006/0223629 | A1 | 10/2006 | Walker et al. |
| 2006/0226596 | A1 | 10/2006 | Walker et al. |
| 2006/0226597 | A1 | 10/2006 | Walker et al. |
| 2006/0229127 | A1 | 10/2006 | Walker et al. |
| 2006/0229128 | A1 | 10/2006 | Walker et al. |
| 2006/0232003 | A1 | 10/2006 | Walker et al. |
| 2006/0247016 | A1 | 11/2006 | Walker et al. |
| 2006/0247026 | A1 | 11/2006 | Walker et al. |
| 2006/0247030 | A1 | 11/2006 | Walker et al. |
| 2006/0247031 | A1 | 11/2006 | Walker et al. |
| 2006/0247035 | A1 | 11/2006 | Rowe et al. |
| 2006/0247041 | A1 | 11/2006 | Walker et al. |
| 2006/0247044 | A1 | 11/2006 | Walker et al. |
| 2006/0248025 | A1 | 11/2006 | Walker et al. |
| 2006/0252482 | A1 | 11/2006 | Walker et al. |
| 2006/0252490 | A1 | 11/2006 | Tulley et al. |
| 2006/0252491 | A1 | 11/2006 | Tulley et al. |
| 2006/0252502 | A1 | 11/2006 | Walker et al. |
| 2006/0252509 | A1 | 11/2006 | Walker et al. |
| 2006/0252510 | A1 | 11/2006 | Walker et al. |
| 2006/0252511 | A1 | 11/2006 | Walker et al. |
| 2006/0252512 | A1 | 11/2006 | Walker et al. |
| 2006/0252513 | A1 | 11/2006 | Walker et al. |
| 2006/0252514 | A1 | 11/2006 | Walker et al. |
| 2006/0252534 | A1 | 11/2006 | Walker et al. |
| 2006/0252551 | A1 | 11/2006 | Walker et al. |
| 2006/0276245 | A1 | 12/2006 | Walker et al. |
| 2006/0281519 | A1 | 12/2006 | Packes et al. |
| 2006/0281520 | A1 | 12/2006 | Packes et al. |
| 2006/0281521 | A1 | 12/2006 | Packes et al. |
| 2006/0287035 | A1 | 12/2006 | Walker et al. |
| 2006/0287038 | A1 | 12/2006 | Walker et al. |
| 2006/0287039 | A1 | 12/2006 | Walker et al. |
| 2006/0287040 | A1 | 12/2006 | Walker et al. |
| 2006/0287045 | A1 | 12/2006 | Walker et al. |
| 2006/0287047 | A1 | 12/2006 | Walker et al. |
| 2006/0287052 | A1 | 12/2006 | Packes et al. |
| 2006/0287054 | A1 | 12/2006 | Walker et al. |
| 2006/0287058 | A1 | 12/2006 | Resnick |
| 2006/0287070 | A1 | 12/2006 | Walker et al. |
| 2006/0287071 | A1 | 12/2006 | Walker et al. |
| 2006/0287072 | A1 | 12/2006 | Walker et al. |
| 2006/0287074 | A1 | 12/2006 | Walker et al. |
| 2006/0287075 | A1 | 12/2006 | Walker et al. |
| 2007/0004502 | A1 | 1/2007 | Walker et al. |
| 2007/0004503 | A1 | 1/2007 | Walker et al. |
| 2007/0004504 | A1 | 1/2007 | Walker et al. |
| 2007/0004505 | A1 | 1/2007 | Walker et al. |
| 2007/0004511 | A1 | 1/2007 | Walker et al. |
| 2007/0015564 | A1 | 1/2007 | Walker et al. |
| 2007/0015568 | A1 | 1/2007 | Walker et al. |
| 2007/0054729 | A1 | 3/2007 | Hornik et al. |
| 2007/0060261 | A1 | 3/2007 | Gomez et al. |
| 2007/0060274 | A1 | 3/2007 | Rowe et al. |
| 2007/0060317 | A1 | 3/2007 | Martin et al. |
| 2007/0060329 | A1 | 3/2007 | Martin et al. |
| 2007/0060330 | A1 | 3/2007 | Martin et al. |
| 2007/0060331 | A1 | 3/2007 | Martin et al. |
| 2007/0060369 | A1 | 3/2007 | Martin et al. |
| 2007/0077978 | A1 | 4/2007 | Walker et al. |
| 2007/0087818 | A1 | 4/2007 | Walker et al. |
| 2007/0087834 | A1 | 4/2007 | Moser et al. |
| 2007/0117612 | A1 | 5/2007 | Walker et al. |
| 2007/0135214 | A1 | 6/2007 | Walker et al. |
| 2007/0135215 | A1 | 6/2007 | Walker et al. |
| 2007/0142113 | A1 | 6/2007 | Walker et al. |
| 2007/0155482 | A1 | 7/2007 | Walker et al. |
| 2007/0155483 | A1 | 7/2007 | Walker et al. |
| 2007/0155484 | A1 | 7/2007 | Walker et al. |
| 2007/0167216 | A1 | 7/2007 | Walker et al. |
| 2007/0173310 | A1 | 7/2007 | Walker et al. |
| 2007/0173322 | A1 | 7/2007 | Swamy et al. |
| 2007/0191094 | A1 | 8/2007 | Walker et al. |
| 2007/0191107 | A1 | 8/2007 | Walker et al. |
| 2007/0197279 | A1 | 8/2007 | Packes et al. |
| 2007/0203971 | A1 | 8/2007 | Walker et al. |
| 2007/0213123 | A1 | 9/2007 | Walker et al. |
| 2007/0254732 | A1 | 11/2007 | Walker et al. |
| 2007/0265062 | A1 | 11/2007 | Thomas et al. |
| 2008/0032763 | A1 | 2/2008 | Giobbi et al. |
| 2008/0039171 | A1 | 2/2008 | Slomiany et al. |
| 2008/0039173 | A1 | 2/2008 | Walther et al. |

FOREIGN PATENT DOCUMENTS

| | | | |
|---|---|---|---|
| EP | 1746550 | A2 | 1/2007 |
| EP | 1762990 | A2 | 3/2007 |
| EP | 1833014 | A1 | 9/2007 |
| WO | WO 97/37737 | | 10/1997 |
| WO | WO 99/10057 | | 3/1999 |
| WO | WO 99/16519 | | 4/1999 |
| WO | WO 00/43087 | | 7/2000 |
| WO | WO 00/69535 | | 11/2000 |
| WO | WO 00/69535 | A1 | 11/2000 |
| WO | WO 01/14029 | | 3/2001 |
| WO | WO 02100494 | A1 | 12/2002 |
| WO | WO 03/004118 | | 1/2003 |
| WO | WO 03017178 | A1 | 2/2003 |
| WO | WO 03/061795 | | 7/2003 |
| WO | WO 03/084625 | | 10/2003 |
| WO | WO 03/089077 | | 10/2003 |
| WO | WO 03/089082 | | 10/2003 |
| WO | WO 03089090 | A1 | 10/2003 |
| WO | WO 2004/013820 | | 2/2004 |
| WO | WO 2004/114073 | | 12/2004 |
| WO | WO 2005/029279 | | 3/2005 |
| WO | WO 2005/031666 | | 4/2005 |
| WO | WO 2005/079242 | | 9/2005 |
| WO | WO 2006/028820 | | 3/2006 |
| WO | WO 2006/052469 | | 5/2006 |
| WO | WO 2007/035618 | | 3/2007 |
| WO | WO 2007/040707 | | 4/2007 |
| WO | WO 2007/076321 | | 7/2007 |
| WO | WO 2007/145999 | | 12/2007 |
| WO | WO 2008/014334 | | 1/2008 |
| WO | WO 2008/022083 | | 2/2008 |
| WO | WO 2008/022084 | | 2/2008 |

OTHER PUBLICATIONS

Written opinion of the international searching authority (international application No. PCT/US07/76224).

Examiner's first report on patent application No. 2003298941.

* cited by examiner

SYSTEMS AND METHODS FOR PLAYING GAMES OF CHANCE OR SKILL USING AN ALTERNATE METHOD OF ENTRY

RELATED APPLICATIONS

This application is a continuation-in-part of, and claims priority under 35 U.S.C. §120 to, U.S. application Ser. No. 10/728,727, entitled "GAME OF CHANCE SYSTEM AND METHOD FOR PLAYING GAMES OF CHANCE," filed on Dec. 5, 2003, which claims priority to U.S. Provisional Application No. 60/431,036 filed Dec. 5, 2002. Both of these applications are herein incorporated by reference in their entirety.

FIELD OF THE INVENTION

The present invention relates to methods of and systems for playing tournament-style games, such as the World Series of Poker, and other games of skill or chance.

DESCRIPTION OF THE RELATED ART

Legalized public and private wagering games of chance and/or skill abound in the United States and throughout the world. A game that has been growing in popularity is known as the "World Series of Poker" or WSOP. The WSOP is a poker tournament-style game that typically uses Texas Hold'em rules of play. The standard method of entry into a tournament-style game is a buy-in of some amount to get a seat at a table. For example, a seat at a high-level table may require a buy-in of about $10,000. Another method of entry includes entry of a player into a satellite tournament where players pay a lower amount of money (lower buy-in) for a seat at the satellite table and the winner of the satellite round gets a seat at a WSOP tournament table. It is also possible to play an online poker game, a winner of which may be awarded a ticket to play at a WSOP tournament table. The ticket may include airfare, the buy-in amount, hotel reservations, etc. These online offerings and satellite table games offer people a way to possibly play in a WSOP tournament without having to pay the $10,000 (or more) buy-in amount.

SUMMARY OF THE INVENTION

Aspects and embodiments of the invention are directed to using an alternate method of entry to enable players to participate in a game of chance or skill. Particularly, aspects of the invention are directed to using an alternate method of entry to enter players into a tournament-style game, such as the World Series of Poker game. In one example, the alternate method of entry may be applied to allow players to enter a sweepstakes, for example, by entering information online or by mailing in a form, the winner of which will be given a seat at a WSOP table. In another example, the alternate method of entry may be applied to allow a player to enter another game, such as a game of chance or other game of skill. The winner of the game of chance or skill may win a seat at a WSOP table.

According to one aspect of the present invention, a method for conducting a tournament-style game is provided. The method comprises acts of providing for an entry of at least one player into the tournament-style game, and providing, to the at least one player, an alternative method of entry (AMOE) into the tournament-style game. According to one embodiment of the invention, the tournament-style game is a wagering game of skill. According to another embodiment, the wagering game of skill is one of poker, blackjack, dominoes, bridge, and mahjongg. According to another embodiment, the tournament-style game has fixed odds of winning the tournament-style game. According to another embodiment, the tournament-style game has non-fixed odds of winning the tournament-style game.

According to one embodiment of the invention, the method further comprises an act of conducting the tournament-style game over a communication network. According to another embodiment, the act of providing an entry of the at least one player in the tournament-style game includes an act of entering the at least one player in a game session following a processing of an entry request of the at least one player by the alternative method of entry (AMOE). According to another embodiment, the method further comprises an act of providing to the at least one player an indication of a game session to be entered by the alternative method of entry (AMOE). According to another embodiment, the act of providing for the alternative method of entry (AMOE) includes providing for an entry of the at least one player in at least two game sessions.

According to one embodiment of the invention, the AMOE is performed by an act of submitting an entry to the wagering game by mail. According to another embodiment, the AMOE is performed by an act of submitting an entry to the wagering game over the Internet. According to another embodiment, the entry fee for the AMOE entry is taken from either the total purse or the game operator's purse. According to another embodiment, the winner's purse is reduced due to the AMOE entry. According to another embodiment, the entry fee for the AMOE entry is paid for by no party, with no moneys or goods exchanged between any parties for this transaction.

According to one aspect of the invention, a wagering game of skill is provided wherein a game player is eligible to play the wagering game of skill through the use of an alternative method of entry (AMOE). According to one embodiment of the invention, the wagering game of skill is available to be played on a communication network. According to another embodiment, the communication network includes at least one of a cable system, the Internet, or wireless network. According to another embodiment, the AMOE is performed by an act of submitting an entry to the wagering game of skill by mail. According to another embodiment, the AMOE is performed by an act of submitting an entry to the wagering game of skill over the Internet. According to another embodiment, a game session associated with the wagering game of skill is provided with an entry by AMOE. According to another embodiment, the game session entered is the next starting game session after the AMOE is received and logged by the game operator. According to another embodiment, the game session entered is the next starting game session designated for AMOE game players after the AMOE is received and logged by the game operator. According to another embodiment, the wagering game of skill is one of poker, blackjack, dominoes, bridge, and mahjongg. According to another embodiment, the wagering game is played in a tournament. According to another embodiment, the alternative method of entry (AMOE) includes an entry of the at least one player in at least two game sessions.

According to another aspect of the invention, a computer-readable medium is provided having computer-readable signals stored thereon that define instructions that, as a result of being executed by a computer, instruct the computer to perform a method for conducting a world series of poker (WSOP) game. The method comprises acts of providing for an entry of at least one player into the WSOP game, and providing, to the at least one player, an alternative method of entry (AMOE) to the WSOP game. According to one embodiment of the invention, the method further comprises an act of conducting the WSOP game over a communication network. According to another embodiment, the act of providing an entry of the at least one player in the WSOP game includes an act of entering the at least one player in a WSOP game session following a processing of an entry request of the at least one player by the alternative method of entry (AMOE). According to another embodiment, the method further comprises an act of providing to the at least one player an indication of a WSOP game session to be entered by the alternative method of entry (AMOE). According to another embodiment, the alternative method of entry (AMOE) includes an entry of the at least one player in at least two WSOP game sessions. According to another embodiment, the AMOE includes implementing a method which comprises acts of entering a player into a game, entering a winner of the game into the WSOP game. According to another embodiment, the game is a game of chance.

Further features and advantages of the present invention as well as the structure of various embodiments of the present invention will be more fully understood from the examples described below with reference to the accompanying drawings. The following examples are intended to illustrate the benefits of the present invention, but do not exemplify the full scope of the invention. All references cited herein are expressly incorporated by reference.

BRIEF DESCRIPTION OF THE DRAWINGS

In the drawings, which are not intended to be drawn to scale, each identical or nearly identical component that is illustrated in various figures is represented by a like numeral. For purposes of clarity, not every component may be labeled in every drawing. The drawings are provided for the purposes of illustration and explanation and are not intended as a definition of the limits of the invention. In the drawings.

DETAILED DESCRIPTION OF THE INVENTION

Figure 1:
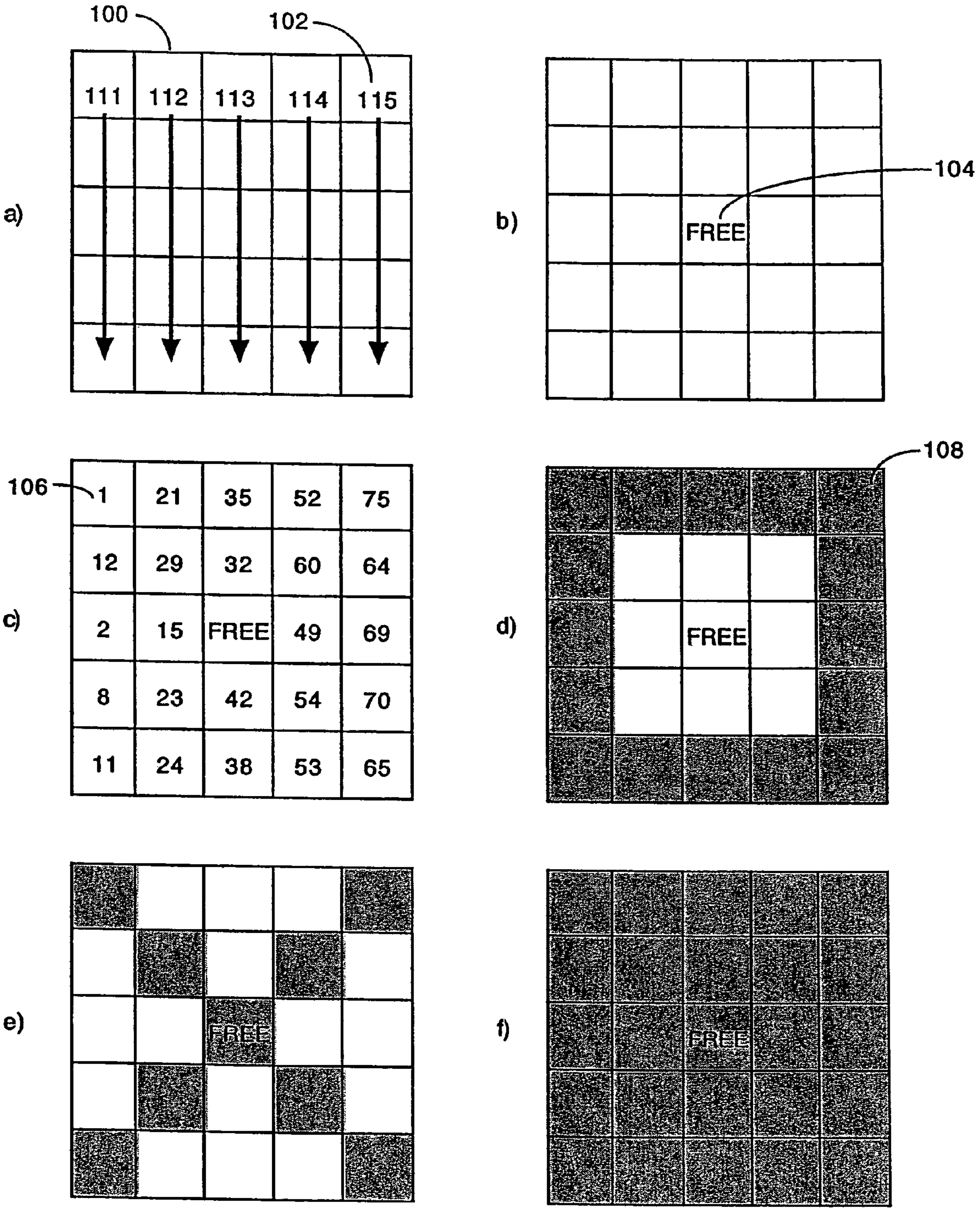
FIG. 1*a* is a diagram of a game card in a five-by-five (5×5) cell matrix according to one embodiment of the invention.
FIG. 1*b* is a diagram of a bingo game card matrix having a free cell marked.
FIG. 1*c* is a diagram of a bingo game card matrix having cell contents being numbers according to one embodiment of the invention.
FIG. 1*d-h* are diagrams showing example possible patterns for a bingo card.
Figure 1:
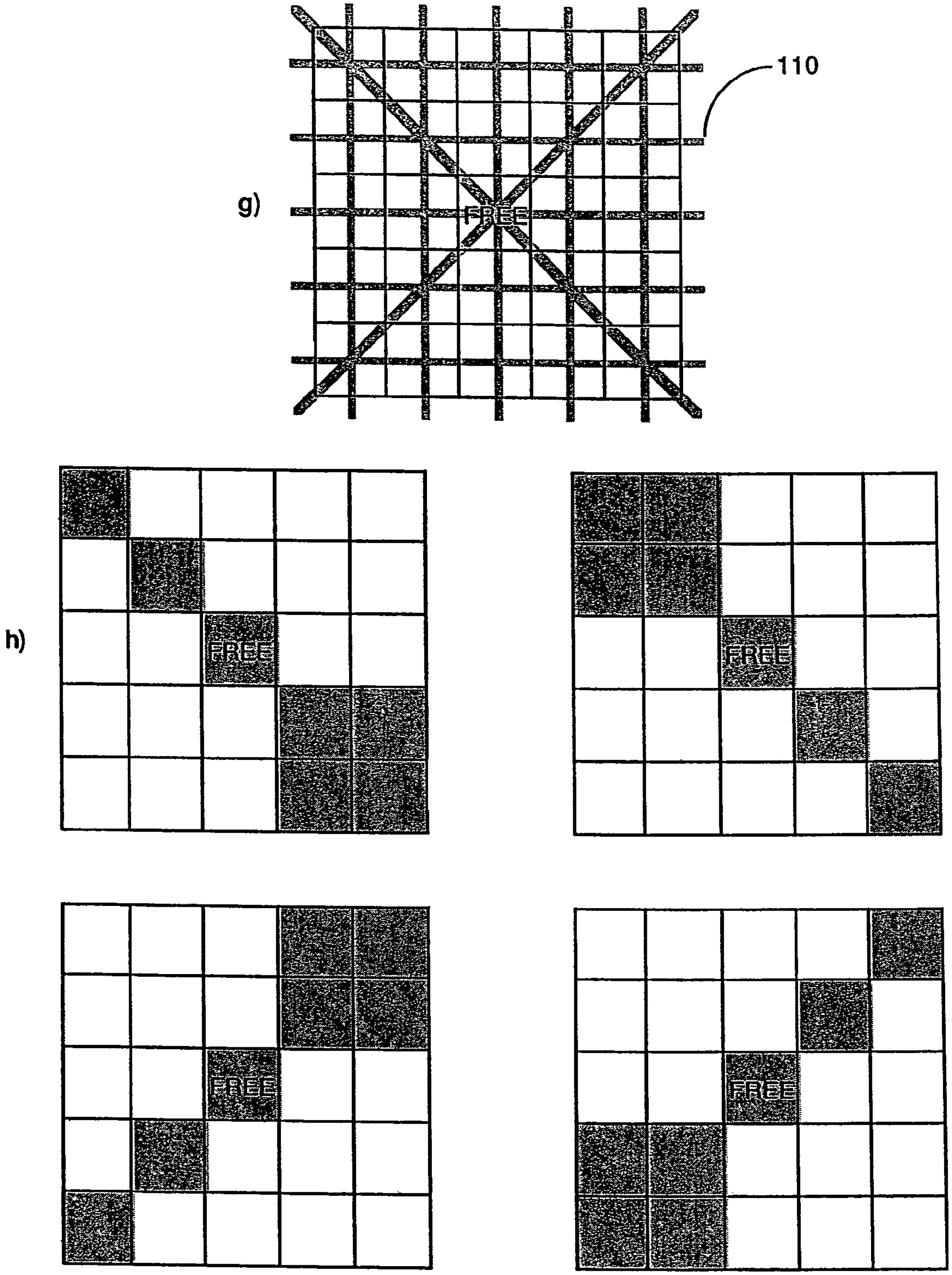

Aspects and embodiments of the present invention are related to alternate methods of entry into games of skill, such as a tournament-style game. As is known, tournaments are used with various types of games to determine a winner among a number of players. Tournaments generally are competitions between players to decide a winner by playing a series of games. One example of such a tournament-style game is the World Series of Poker (WSOP) tournament. Other aspects of the invention relate to a new game that includes elements of the well-known wagering games of chance known as bingo and keno, and can be applied to online gaming.

Various illustrative embodiments and aspects thereof will now be described in detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Disadvantages associated with WSOP tournaments include the difficulty of gaining access to a table because the buy-in amount is typically very high and thus not affordable for most people, and the number of seats are limited. The present invention provides increased accessibility to WSOP games for players, thereby enabling more players to participate in WSOP and other tournament style games.

According to one embodiment of the invention, a game is provided which has a fixed odds of winning through the drawing of a predetermined number of winning cell content but is unlike keno in that a winning pattern must be obtained on a game card from the matches between the game card cell content and the drawn winning cell content.

Prior to a game session, a game player may need to pay for playing. For example, a game player may pay using money or loyalty points. In particular, a game player may pay using money by debit card, credit card, check, cash or from an account credit either with the gaming operator or an affiliated organization. Alternatively, a game player may pay using loyalty points from an account held either by the gaming operator or by an affiliated organization. Loyalty points may be obtained from any type of organization but are generally associated with loyalty programs such as frequent flier programs for airlines, frequent stay programs for hotels or frequent visitor programs for casinos. The game player may pay in person (e.g., by using a cashier) or by other remote methods including telephone, handheld device, kiosk, computer through the Internet or other network and mail. Payment may be in any form that is legal in the particular jurisdiction.

In one embodiment of the invention, players may subscribe to play multiple consecutive game sessions. That is, the player pays at one time to play many consecutive game sessions. According to one embodiment, such players may subscribe to multiple games (e.g., fixed-odds or non-fixed odds games) using a computer-based interface (e.g., a personal computer, cell phone, PDA, set-top box or other interface). These subscribed games may be automatically played (e.g., by a computer system) without the need to interact with the game provider as discussed more fully below. In another embodiment, the player may also choose to have his or her subscription automatically renewed.

According to one embodiment of the invention, players may also enter to play this or any other wagering game of skill or chance using an alternative method of entry (AMOE). Conventionally, AMOE is a required available method of entry into a sweepstakes that does not require a purchase. Sweepstakes are usually used as a promotional or marketing tool. Any company or organization offering a sweepstakes ticket in exchange for a purchase is typically required to also offer an AMOE to the sweepstakes that is not linked to a purchase. A common AMOE method includes sending, by an individual interested in entering the sweepstakes, to the sweepstakes offer or a postcard with his or her name, address or other contact information. Another AMOE method includes signing on, by the individual, to a free Internet website and submitting the required information for free. Numerous other methods may be used for AMOE. Most sweepstakes limit the number of times one individual or family may enter a sweepstakes by AMOE. An individual entering a sweepstakes by AMOE is required by law to have the same odds of winning each of the available prizes as do individuals who have paid for entry (e.g., by making a purchase of a product or service).

According to one embodiment of the invention, it is realized that an AMOE (alternative method of entry) may be used to enter a game of chance. More particularly, it is possible to develop, implement and run wagering games of chance, including the inventive games described herein, with an AMOE method of entry. AMOE methods are conventionally used to enter a player in a sweepstakes, which is not considered wagering or gambling. Thus, according to one embodiment of the invention, an individual may enter a wagering game of chance by AMOE using, for example, the postcard or the online method outlined above. The wagering game of chance player entering by AMOE may also have the same odds to win the payout associated with the game session in which they are entered. The wagering game of chance player entering by AMOE may also be limited to a small number of game sessions within a given period of time. For example, the player may be limited to one game session in one year, two game sessions in one month, or other limited number of games in a defined period. It should be appreciated that a player may be limited to any number of sessions and defined periods, and that the invention is not limited to any particular implementation.

According to one embodiment of the invention, other wagering games of skill or chance include well-known games of skill or chance as well as novel or proprietary games of skill or chance. Examples of well-known games of skill or chance include poker, blackjack, dominoes, mahjongg, bridge, slots, and bingo; any type of poker game may be played this way including Texas Hold'em, Pai Gow, and 5- or 7-card stud or draw. The AMOE entry may be used by a player to enter a game against the house or against other players. An entry to play against other players may include entry into a tournament where the house retains part of all paid entry fees; the retained house fees may be used to pay the entrance fee at a full or reduced rate for AMOE entries in the tournament. According to another embodiment, the prize pool may be diluted by having the entry fee for the AMOE entry go unpaid.

According to one embodiment, the game session that the game player entering by AMOE is entered into may be determined by the game player on the AMOE entry form. For example, the post card AMOE may be required to state the date and the time of the game session that the game player wants to enter. Alternatively, the game session entered may be the next starting game session after the AMOE is received and logged. As another alternative, AMOE entries may be assigned to a specific game session(s) each hour, day, week or other time interval.

Figure 3:
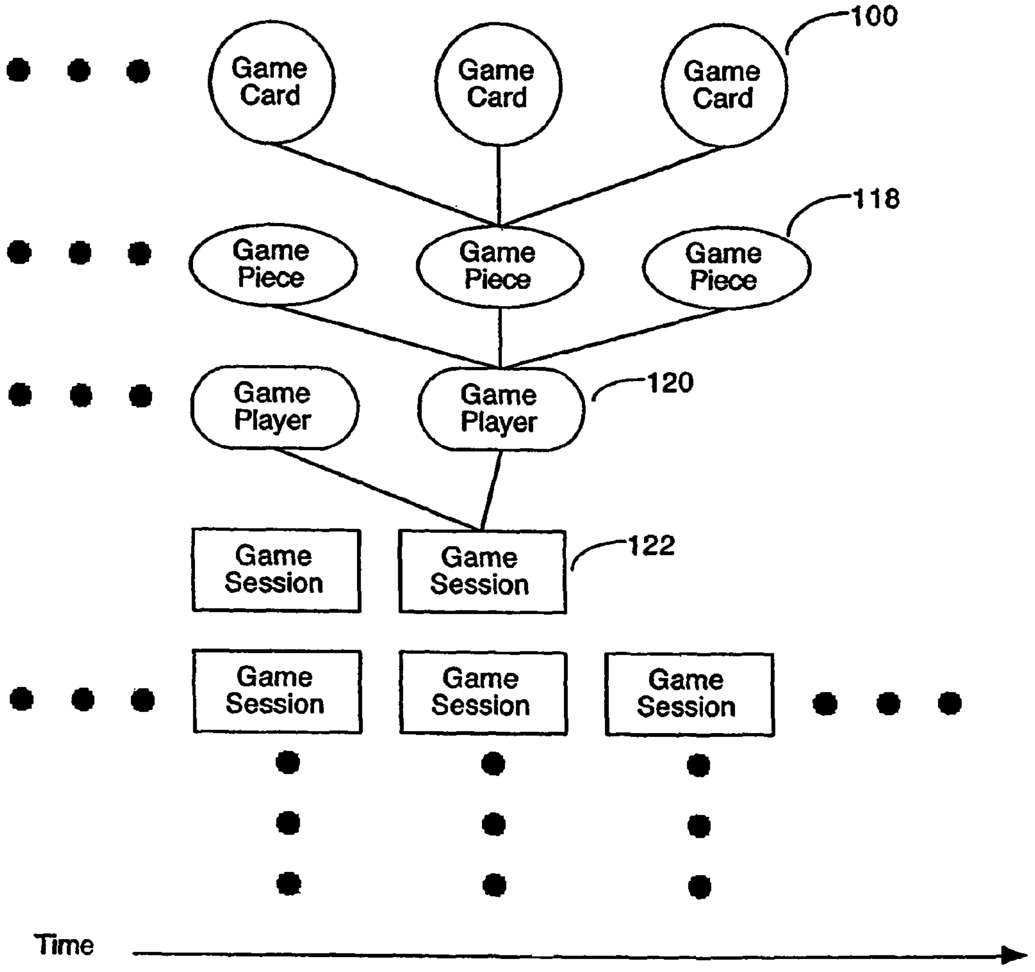
FIG. 3 is a block diagram showing an interrelationship between game sessions, players and cards according to one embodiment of the invention.

FIG. 3 shows an example relationship between time, game sessions, game players, game pieces and game cards according to one embodiment of the present invention. As shown in FIG. 3, the three dots denote when an item may proceed ad infinitum. For example, a player can play one or more game pieces (e.g., from one piece up to a very large number of pieces). As discussed above, a player 120 may pay for the game or obtain access to the game through AMOE. A game player (e.g., player 120) may play at least one game piece 118 for a particular game session 122. Also, a player may have as many game pieces 118 as they desire to play in each session (e.g., session 122). Each game piece 118 may then be made up of one or more game cards 100. According to one embodiment, the number of game cards 100 per game piece 118 may be predetermined (that is, determined at any time prior to the beginning of the game session, e.g., one second, one year in advance) for each game session 122. It may also be possible that each game card 100 within a game piece 118 has a different card pattern, different winning pattern, predetermined cell content set or any other predetermined parameter.

Referring to FIG. 1*a*, a game card 100 includes a number of cells 102. Each player in a game session 122 has at least one game card 100 with the same pattern (see 128 of FIG. 4 for an example of a pattern) or matrix of cells 102. In one embodiment, each cell 102 of each game card 100 has a cell content 106. In one embodiment, the cell content 106 is one of a predetermined set of cell content (FIG. 4, 126) for that game session 122, e.g. integers from 1 to 75 or English letters from A to Z or a mixture of the two. The cells 102 of the game card 100 in each session may be subdivided into groups, each of which includes a subset of possible cell content, e.g. a first column (e.g., item 111 of FIG. 1) includes integers 1 to 15, a second column (e.g., item 112 of FIG. 1) includes integers 16 to 30, on up to a fifth column (item 115) having integers 61 to 75 just as in the traditional game of bingo. Preferably, every game card 100 is unique in a game session 122, although duplicate cards may exist.

According to one embodiment of the invention, the object of a game of chance is to match cell content of a particular game card with the drawn winning cell content (item 134) and to have the matched cell content cover at least the predetermined winning pattern 108. In FIG. 1, for example, the winning pattern 108 is denoted by the gray shading. Initially, because no winning cell content has yet been drawn, each game card does not have matching cell content (unless the cell content is a free or wild spot). The winning cell content is drawn from the predetermined set of cell content (e.g., item of 126). In one embodiment, winning cell content may be drawn one at a time up to a predetermined fixed number of drawn winning cell content (item 124 of FIG. 4).

Because it may be possible to have more than one game card 100 per game piece 118, a winning pattern may also cover more than one game card. For example, the winning pattern may be "W" on the first card, "I" on the second card, and "N" on the third card for a game piece 118 containing three game cards for a game piece 118 containing three game cards. Alternatively, for a game piece 118 containing three game cards the winning pattern may be obtained by a standard 5-in-a-row on any of three cards.

Figure 4:
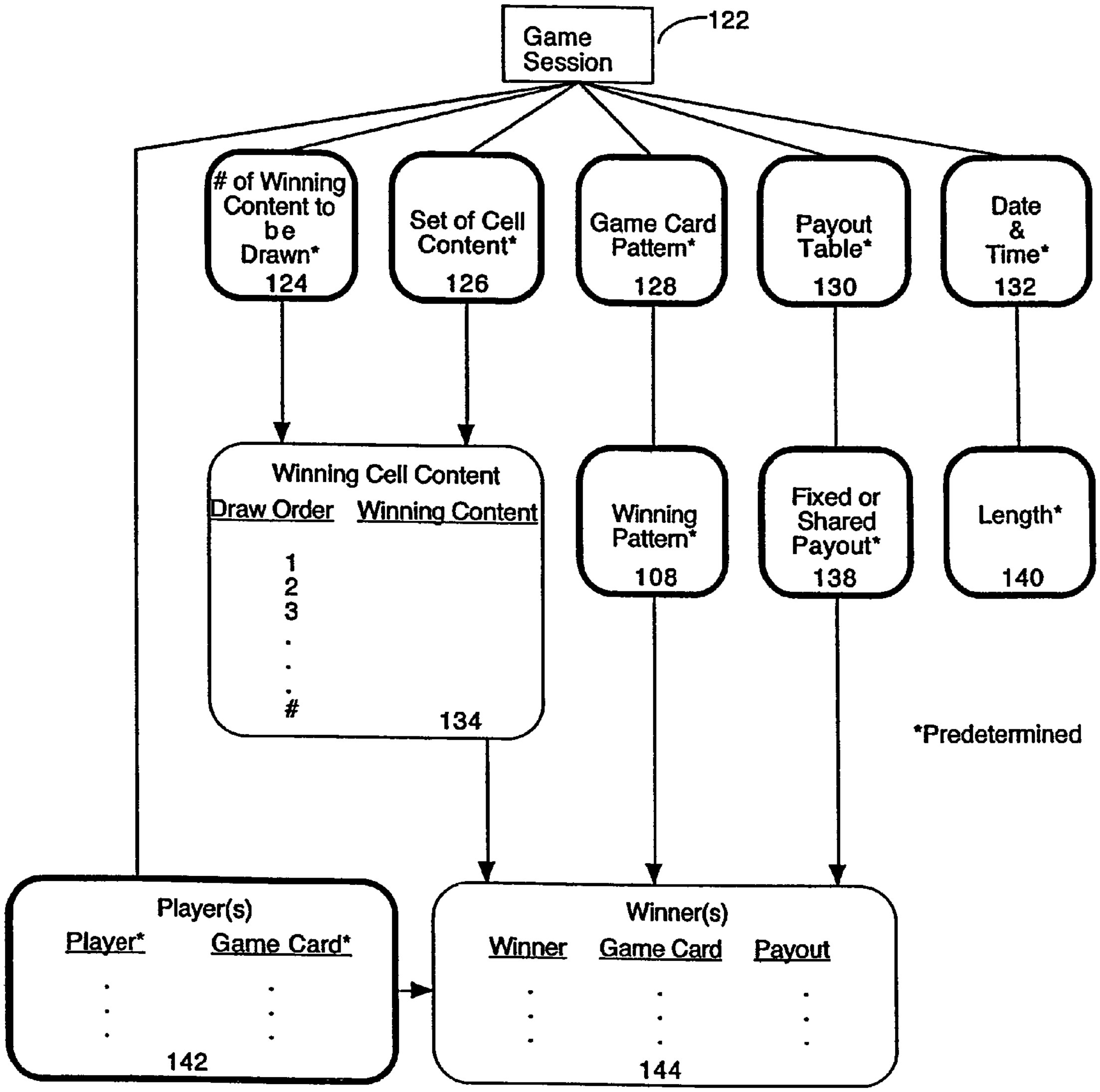
FIG. 4 is a diagram showing components of a game session according to one embodiment of the invention.

According to one embodiment, a game session 122 also includes an associated predetermined payout table (e.g., item 130 of FIG. 4). Payout table 130 may include a listing of the ways to obtain a payout and its payout amount. Possible ways to obtain a payout include, for example, matching at least the winning pattern 108, matching only the winning pattern, matching part or none of the winning pattern, and matching none of the game card.

A payout table may also be applied to tournament-style games, such as, for example, a WSOP game. Because poker is a game of skill and the total dollar amount to be won in any round depends on the bets the players make, a payout table may be constructed based on percentages of the total dollar amount in play. The payout may be constructed to award certain percentages based on a players final position in the tournament, and those percentages may depend on the number of players in the tournament. For example, in a tournament of ten to twenty players, the payout table may award 50% to the player in first place, 30% to the player in second place, and 20% to the player in third place with all other players receiving nothing. In tournament-style poker, first place is awarded to the last player left with money, second place is awarded to the last player eliminated, and so on.

The payout amount for each method of winning various games may depend at least in part upon the odds of obtaining the particular way to obtain a payout. For example, in the cell-based game described above, the odds of matching a winning pattern with thirty winning cell content drawn may be twice that for twenty winning cell content drawn, but the payout may be only one and one half times higher for matching the winning pattern in twenty versus thirty winning cell content drawn. Thus, the payout amount may be varied (e.g., increased) if the winning pattern was obtained in less than the predetermined fixed number of drawn winning cell content. For example, if the predetermined number of drawn winning cell content is thirty and the payout for that is thirty credits, then if the winning pattern is obtained within the first twenty drawn winning cell content then the payout for obtaining that may be forty-five credits. Other payout schemes may be used, and the invention is not limited to any particular scheme. Also, a game card 100 may have, in one embodiment, only one payout per game session 122.

A payout table (item 130 of FIG. 4) may also include adjustments for a player's subscription. For instance, the payout may be adjusted according to their subscription level. For example, a payout to a particular player may be increased for example, if the player has a multiple game subscription, multiple card subscription, high payment per game card or any combination of the three. The payout may also be adjusted for numerous other criterion including, for example, frequent player credits. Of course, payout adjustments generally must meet any legal requirements for the gaming jurisdiction in which the game is played.

The payout table for each game session may also be supplemented by a jackpot that transfers from game session to game session. These types of jackpots are commonly called rolling or progressive jackpots. A rolling jackpot may be, for example, the same amount that transfers from game session to game session until it is paid out. A progressive jackpot is a rolling jackpot that increases as more game sessions, game cards or other criterion are played. Rolling or progressive jackpots are typically paid out for a difficult way to match the drawn winning cell content. For example, in the case of the conventional game of bingo, if all cells of a five by five (5×5) matrix are covered in the first twenty-five drawn winning cell content or no cells are covered after fifty drawn winning cell content, the rolling jackpot may be paid out.

The final payout may also be affected as to whether the game has a fixed payout for a win or whether the payout is shared (e.g., item 138 of FIG. 4). If the payout is fixed for a win, according to one embodiment, all players that have a game card winner for a certain type of win will be paid the amount listed in the payout table for the win. In this instance, each player is playing solely against the game operator. If the payout is shared, then all players that have a game card winner for a certain type of win will be paid a total of the amount listed in the payout table. Each player may receive a share of the total payout depending upon how much he or she paid for the game or any other legal criteria.

The final payout may also be affected by bonus play which is well-known in the gaming industry. Bonus play works to increase some payouts by offering the player a chance to multiply a payout.

Alternative to a subscription, a player may be entered in a tournament-style game. As discussed above, one aspect of the present invention relates to allowing a player to enter a tournament-style game via an AMOE entry. Payout to a player in a tournament-style game may, for example, be performed by awarding a jackpot funded by buy-in fees paid for by the players. The jackpot may be paid, for example, only after there is a single winning player remaining in the tournament after all game sessions in the tournament have been played.

One or more game sessions may proceed concurrently. Parameters of the concurrent game sessions 122 may be the same, similar, or different. For example, drawn winning cell content may be used for one or more concurrent sessions if, for example, the predetermined set of cell content is the same for the one or more concurrent sessions. As a further example, the game card pattern of cells may be different in all the game sessions. In another example, several tournament-style games of a particular round may be played simultaneously, the winner of each game from that round then playing in a second round tournament against each other. This principle may of course be extended to apply to numerous rounds and is not limited to two rounds. Additionally, game sessions may run continually, i.e. one after another. When one game session ends, another session will begin immediately or in a short period of time. The game sessions may follow a precise time schedule so that players know when games will begin. For example, if game play in a session requires four and a half (4.5) minutes to complete, then the next game may start immediately or in a defined period (e.g., thirty seconds) to maintain to a schedule of games every five minutes (for instance, at :00, :05, :10, :15, :20, :25, :30, :35, :40, :45, :50, :55 of each hour). Because, according to on embodiment, the game sessions may run continually, it may be possible that a particular game session will have no game player or game card that is being played within the particular game session.

In the case of a tournament-style game where players are eliminated during head-to-head matches (e.g., totaling all players' winnings at the end of a round, the player with the highest total may move on to a next round), such game sessions may be untimed or may be limited to a predetermined time limit. As discussed, players may be permitted to play against one another in a satellite tournament (e.g., an online satellite tournament), with one or more winners advancing onto a seat in a final tournament or one or more intermediate tournaments. Such tournaments may include a poker-style game such as the well-known Texas Hold'em game. However, it should be appreciated that other poker-style games may be played in a tournament format.

Prior to a game session, cell content on at least one game card may be chosen by a game player from the predetermined set of cell content for a particular game session. A game player may choose the cell content of a game card manually or may use a computer system to select the cell content for a particular game session. Alternatively, according to one embodiment of the invention, a computer system may automatically choose the cell content on at least one game card for a game player. Because, according to one embodiment, a computer system can both choose the cell content and play the game, a player need not configure and attend each game playing session, as discussed further below.

Referring to FIG. 1, the cell content 106 may be a free spot 104, a blank spot or a wild spot. A free, blank, or wild spot may be in any cell of the game card 100. Preferably, in one embodiment, there is only one free, blank and/or wild spot per game card. It is also possible that there is no free, blank or wild spot on a game card.

Besides a free, blank or wild spot, the cell content 106 may be any letter or character, number, symbol, color, logo, shape, drawing or other item that may be represented in the cell. The cell content 106 may be, for example, a letter or character of any language (e.g., English, Russian, Japanese, Chinese, Greek, etc. Cell content 106 may also be any random combination of letters or characters including words and phrases. Cell content 106 may also be a number expressed in any language (e.g., English, Chinese, Roman, etc. The number may be represented by items (e.g. the number of stars in the cell or the dots on the face of a die or dice). The number may be negative, zero, positive, integer, fraction, decimal, real or imaginary. Preferably, according to one embodiment, the number is a positive integer. Cell content 106 may also be a symbol. For example, astrology, religion, printing and computer fonts, road signs, or law symbols may be used. Cell content 106 may be any color including black, white or shade of gray. Cell content may also be a logo of a company or product name or trademark. Any type of cell content may be used, and the invention is not limited to any particular type.

Preferably, cell content 106 of each cell 102 is unique for the game card 100 to maximize the different possible cell content to match the drawn winning cell content for a game session. Also preferably, each game card in a game session is a unique combination of cell content 106 and cell position for that game session.

Figure 2:
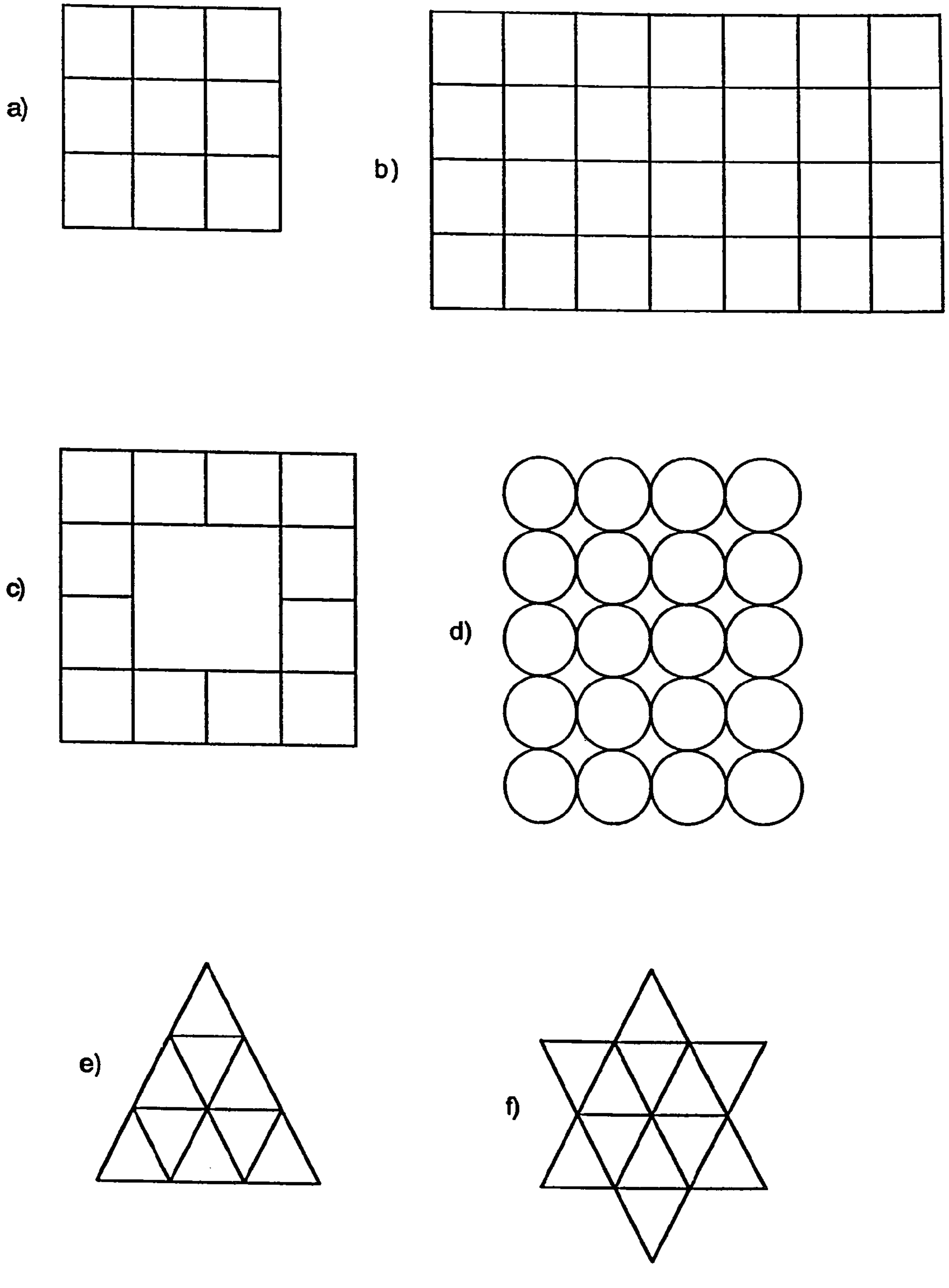
FIG. 2*a-i* are diagrams showing winning patterns in a game card matrix according to various embodiments of the invention.
Figure 2:
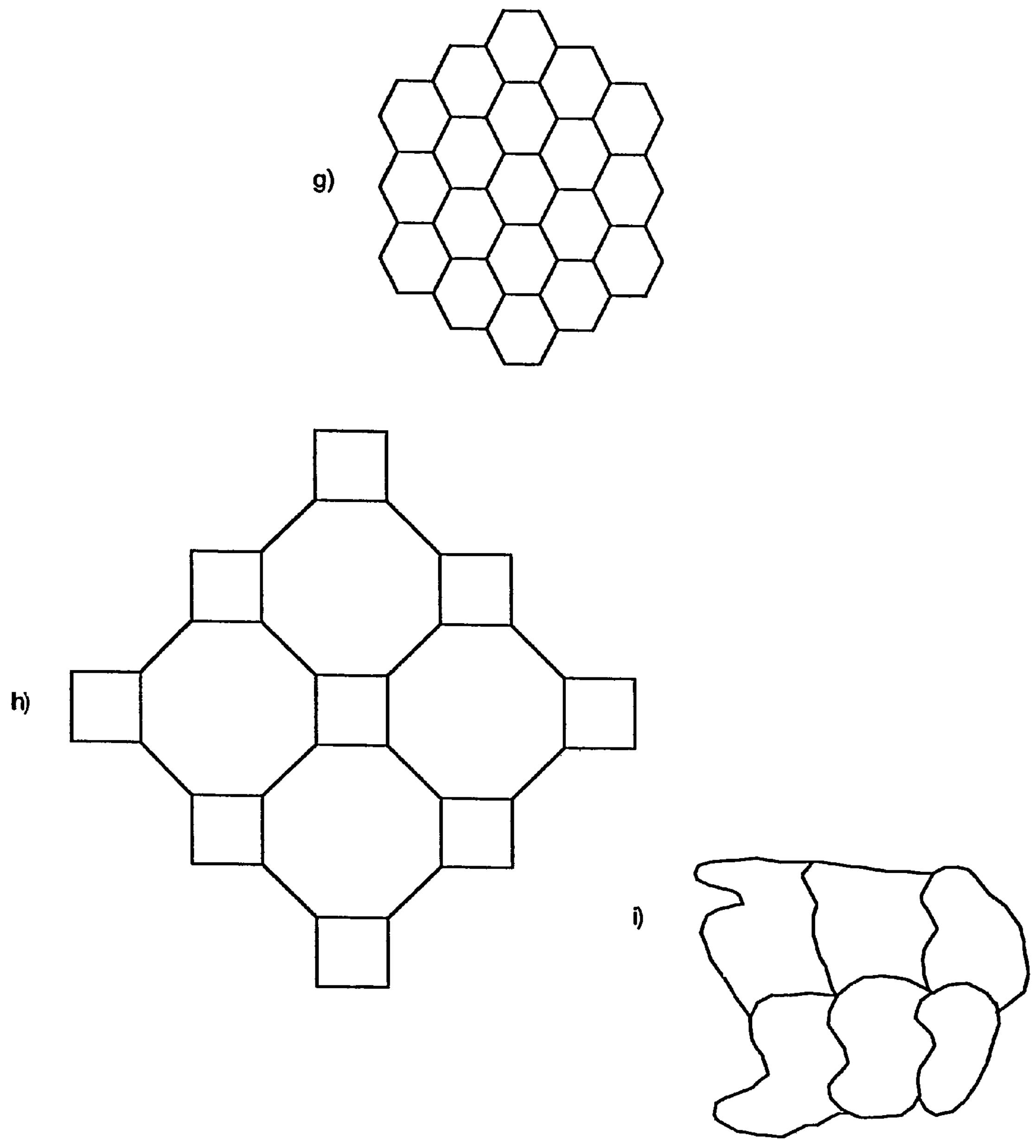

Cells (e.g. item 102) of the game card 100 are generally arranged in a pattern. The pattern includes three components: shape of the cells 102, cell connectivity (or how the cells are connected to each other) and the size of the total pattern. For example, in FIG. 1*a* the cells are square and are attached to each other side-to-side in a five by five (5×5) matrix. FIG. 2 shows examples of some of the numerous other possible cell shape, cell connectivity and pattern size combinations. These are just examples, and the invention may implement other shape, connectivity and size combinations.

Referring to FIGS. 1*a* and 2, cells 102 on a game card 100 all have the same shape and size as shown in FIGS. 1*a* and 2*a*-*g* or cells may have a different shape or size such as a combination of octagons and squares as in FIG. 2*h*.

Shape of the cells 102 may be any shape including, but not limited to, a circular, triangle, square, pentagon or hexagon shape. Also, it is possible that all cells have different shapes. For example, various aspects of the invention may be implemented with a game card having cells with irregularly shaped walls as shown in FIG. 2*i*. The cells 102 may be connected to each other side-to-side, corner-to-corner, point-to-point or any other method.

Patterns may also have holes in them. For example, in FIG. 2*c*, square cells are connected to make a larger square having a hole in the middle. Alternatively, the pattern of FIG. 2*c* has a pattern with a large square cell in the center. Another example pattern shown in FIG. 2*h* includes a combination of octagonal and square cells as described above or may include a matrix of octagonal cells with square holes in the middle. In another example pattern shown in FIG. 2*d* includes a pattern of circular cells having four-sided holes or a pattern having circular and four-sided cells. Further, holes may be the same size and shape as the cells. For instance, in FIG. 2*e*, three internal triangles of the pattern may be holes among six exterior triangles. It should be appreciated that other patterns may be used, and the invention is not limited to any particular pattern.

The winning pattern for a game session may be, any subset of all the cells in the associated game card pattern. The winning pattern may be, for example, a random subset of all cells that may not appear to have a pattern. Preferably, the winning pattern may be a recognizable pattern of cells. The winning pattern may have only one way of being achieved and, as shown in FIGS. 1*d*-*f*, the winning pattern may or may not include the cell with the free, blank or wild spot. The winning pattern may also be achieved in a number of different ways. For example, a five-in-a-row winning pattern in a five by five matrix (as in bingo) can be achieved twelve different ways as demonstrated by the shaded lines shown in FIG. 1*g*. A winning pattern known as "small kite" has four possible configurations as shown in FIG. 1*h*. Also, more than one winning pattern may be possible for a particular game session. For example, a winning pattern may include the triangles of six points of the pattern shown in FIG. 2*f* or six internal triangles.

Winning cell content may be randomly drawn by hand or by computer system from the predetermined set of cell content for a game session. When the drawing is performed by hand, the winning cell content may be chosen, for example from pieces of paper out of a hat or drum, by using balls or discs in a rotating or air blown sphere, or any other method that can be used for drawing content for a game session (e.g., for the games of keno or bingo). Hand-drawn winning cell content may then be displayed or entered into a computer system. Preferably, the winning cell content is randomly drawn by computer system from the predetermined set of cell content for a particular game session.

After a winning cell content is drawn, a player may manually daub his or her game card(s) on paper or by whatever means the player is viewing the game proceedings (e.g., by daubing a game card in an interface of a computer system). The game player may view the game proceedings using television, wireless or line telephone with display, handheld device, kiosk, computer or in person. For example, the game player may operate a computer system that has an Internet-enabled interface (e.g., using Macromedia Flash or Java) and the computer system may display streamed game information within that interface. It should be appreciated that any interface may be used to display game proceedings and that the invention is not limited to any particular interface. Depending upon the viewing medium, it may be necessary to download game information prior to viewing while another viewing medium may allow viewing of the streamed game information.

When a player matches enough winning cell content to obtain a winning pattern for a game session, the player informs the game operator that they are a winner. If the game player is playing the game in person, this act of informing may include raising one's hand or visually indicating that he or she has a winner. The game operator then verifies that the game player won by checking the daubed game card cell content against the drawn winning cell content. If the game player plays the game remotely, for instance over the web or interactive television, or if the game operator is a computer system, then other electronic or voice indication method may be necessary to authenticate and verify the game player and the winning game card. Such methods are well-known in the remote and electronic gaming industry.

In one embodiment, a computer system (e.g., a personal computer PC, set top box, PDA, phone) may automatically daub the matching cell content of each game card being played in a game session after each drawn winning cell content. The game player may view the game proceedings using any interface including a television, a wireless or other type of telephone having a display, a handheld device, a kiosk or computer. However, because the computer is adapted to automatically daub matching cell content, the game player may decide not to observe the drawing of winning cell content.

The computer system may then automatically determine when a game card is a winner. Such a result may be automatically authenticated and verified by the computer system. In this instance, the computer system may then notify the game player that he or she has won and what the winnings are after the computer has consulted a predetermined payout table (e.g., item 130 of FIG. 4 as described above). The computer may also determine if the winning needs to be shared with other winning game cards. Notification of winning to a game player may occur by mail, e-mail, computer web or network, telephone, television, pager, fax, kiosk or any other method.

When the computer system daubs matching cell content on one or more game cards, the computer system may also determine the game card(s) and the associated player identity (ies) that are closest to winning after each drawn winning cell content. The computer system may then display the game card(s) or the identity of the game player(s) closest to winning to all game players observing the game session. The computer system may also choose to display only one or a subset of all the game cards or identities of players closest to winning to a particular game player observing the game session.

After a winner is authenticated and verified, the computer system may then notify all game players observing the game session that a win has occurred. Additionally, the computer system may display the winning game card, the winning player's identity or the payout. Because the game session does not end until a predetermined fixed number of winning cell content is drawn, it is possible for this notification to occur several times, each time for a different game card during a particular game session.

As stated above, it may also be possible that a game card may be a winner because the game card does not match the drawn winning cell content. For example, in a game session having forty drawn winning cell content out of a predetermined set of cell content of seventy-five items, a game card that has no matches may be a winning card. Such a card may have a payout equivalent to a game card having a five-in-a-row matching pattern.

In another embodiment, the computer system may be used to conduct a tournament-style game, such as a WSOP game. Players may enter the tournament game through a computer interface, such as a web page or other software user interface. Game sessions may be conducted "locally" i.e., on the machine at which the player is playing, or may be conducted online over the Internet. The player may play against computer generated players or against other live players, for example, over the Internet. The computer may indicate, through the user interface, the ongoing status of the game, whether the player is winning or losing, etc., and may keep track of bets placed by the player and/or entry fees paid by the player. For example, a computer payment method (such as Paypal) may be used to debit and/or credit a player's account based on the number of games a player enters, bets won and lost, etc., as is discussed below.

During a period of time between game sessions, a game operator may make announcements, rest, or perform any number of actions. If the game is played using a computer system, advertisements, sponsorships, public service announcements or any visual or auditory content may be inserted into these periods. Advertisements, and other content may also be inserted into the game display during a game session.

In the configuration where the computer automatically daubs the game cards for the players, it may be beneficial to allow a game player to remotely access information indicating the results of a game session after the session has completed. In this manner, a player may not need to attend a particular game session, as results of each session may be accessed at a later time. Further, the player need not access the game session results from a same interface at which the game was played or subscribed. Remote access may be gained, for example, by kiosk, telephone, television, computer, handheld device or any other device or system that is appropriate. Information that may be accessed regarding a past game session may include whether the player won or lost, what the player's payout was, or other information relating to the past game session.

A game player may also be able to replay or review a past game session using a video-enabled device. For instance, a kiosk, telephone having a display, television, computer or handheld device may be used to replay a past game session. By accessing a selected game session in the computer system, a game player may be able to see a past game session as it occurred, the winning cards and winning game player identity (ies), the drawn winning cell content, or possibly any other aspect of the game session of interest.

Preferably, the game, its game sessions, and the game play are partially or fully automated using one or more computer systems. More preferably, the game, its game sessions, and the game play are fully automated. A computer system may be a single computer that may be a supercomputer, minicomputer or a mainframe or personal computer. A computer system used to run a game and its associates sessions and may also include any combination of computer system types that cooperate to accomplish system-level tasks. Multiple computer systems may also be used to run a game. The computer system also may include input or output devices, displays, or storage units. It should be appreciated that any computer system or systems may be used, and the invention is not limited to any number, type, or configuration of computer systems.

A computer system that executes a game according to various embodiments of the invention, may include, for example, three system components. One system component may handle payment, subscription and/or AMOE by players to enter the game sessions. Another system component may handle playing and viewing the game and a third system may handle payouts. Such a game system may also be connected (e.g., by direct line or network) to other computer systems including systems for handling casino or hotel loyalty programs, reservations, in-room television viewing, gambling floor kiosks, or other systems. Connections to other computer systems may be performed using one or more of the system components described below. The computer system may be adapted to handle entry by players into a variety of games, including games such as those described above and tournament-style games, including, but not limited to, WSOP games.

A payment component may include one or more of a number of well-known systems. For example, a player may be able to pay to play one or more games using a telephone and speaking with a call center representative who inputs player, payment and subscription information manually into a computer using a user interface. In the computer, data may be stored in a data which is stored in a memory of the computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Examples of UIs that may be implemented with various aspects of the invention include a graphical user interface (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Player information may also be entered into a payment system component. Player information that may be input includes name, address, telephone number and age, and payment information may include credit or debit card number or loyalty account information. Also, as discussed above, various aspects of the present invention relate to subscription gaming for wagering games of chance. Subscription information may be input, including, for example, a first game session date and time, a number of game sessions to be played, a number of game pieces to be played per game session and bet per game piece. Based upon the payment and subscription information, the call center representative may verify that the payment information is valid and that enough credit or funds is available for the player's desired subscription.

A similar system may exist for players entering using the mail or a post card AMOE except the call center may be replaced by a mail center having representatives that enter information into one or more computers via a user interface. For example, a cashier that works at a casino directly with players that pay cash or credit to play, may also have the ability to input player, account and subscription information for AMOE players using a user interface of computer.

Computer systems or pay engines for handling electronic or online payment and subscriptions may also be used. Such systems are well-known, and include such systems as Paypal, iKobo, Verisign, and other systems. Using such a system, a player interacts with a user interface to input information into a payment data structure that may be transferred to one or more payment systems (e.g., PayPal).

Various pay systems and one or more user interfaces may be located on computer systems coupled by a network with the computer system(s) storing data having player, account and subscription information. As used herein, a "network" or a "communications network" is a group of two or more devices interconnected by one or more segments of transmission media or active communications equipment on which communications may be exchanged between the devices.

The above examples are merely illustrative embodiments of a pay system component. It should be appreciated that an illustrative embodiment is not intended to limit the scope of the invention, as any of numerous other implementations of the pay system, for example, variations of online payment, are possible and are intended to fall within the scope of the invention. For example, the payment system may include using pay-per-view systems associated with interactive television or the pay engine may additionally deliver a receipt to the player by either e-mail or mail. None of the claims set forth below are intended to be limited to any particular implementation of a pay system unless such claim includes a limitation explicitly reciting a particular implementation.

Payout systems are also well known. Any of a number of standard systems or payout engines for making payouts for winning may be used. For example, a standard application programming interface such as 'Quicken' (Intuit Inc., Mountain View, Calif., USA) may be used to write and mail checks or credit a debit card, credit card (if legal in the jurisdiction of play) or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of the payout system. Such an illustrative embodiment is not intended to limit the scope of the invention, as any of numerous other implementations of the payout system, for example, variations of online payout, are possible and are intended to fall within the scope of the invention. Additionally, a cashier may also have access to payout information using a user interface to the payout data structure through a network; the cashier then makes a payment to the winning player based upon the accessed information. None of the claims set forth below are intended to be limited to any particular implementation of a pay system unless such claim includes a limitation explicitly reciting a particular implementation.

A game playing and viewing system according to one embodiment of the invention may comprise of a number of components for performing specific functions. These components may include, for example, storage means that store data structures having information relating to game configuration and game play. For example, such information may include game variation information, present game session information, game session history and win history. A game playing and viewing system may also include components to access payment and payout data structures.

FIG. 4 illustrates various embodiments of a data structure associated with a game session 122. A game session may include a number of predetermined items including session date and time 132, session length 140, payout table 130, payout type 138, game card pattern 128, winning pattern 108, set of cell content 126 and the number of winning content to be drawn 124 as well as who the players are and the game card(s) 100 assigned to each. In one embodiment of the invention, a game piece(s) adds another level of complexity to a game session.

From a predetermined number of winning content to be drawn 124 and set of cell content 126, a game session has associated with it winning cell content 134 that identifies the content necessary to determine a winning card. As discussed, content 134 may be drawn by hand or by the computer system. Further, the specific draw order of the winning content may be stored for later reference (e.g., for replay at a later time). A game session may also have one or more associated winners 144. According to another embodiment, it is possible that a particular session may have no winners.

Figure 5:
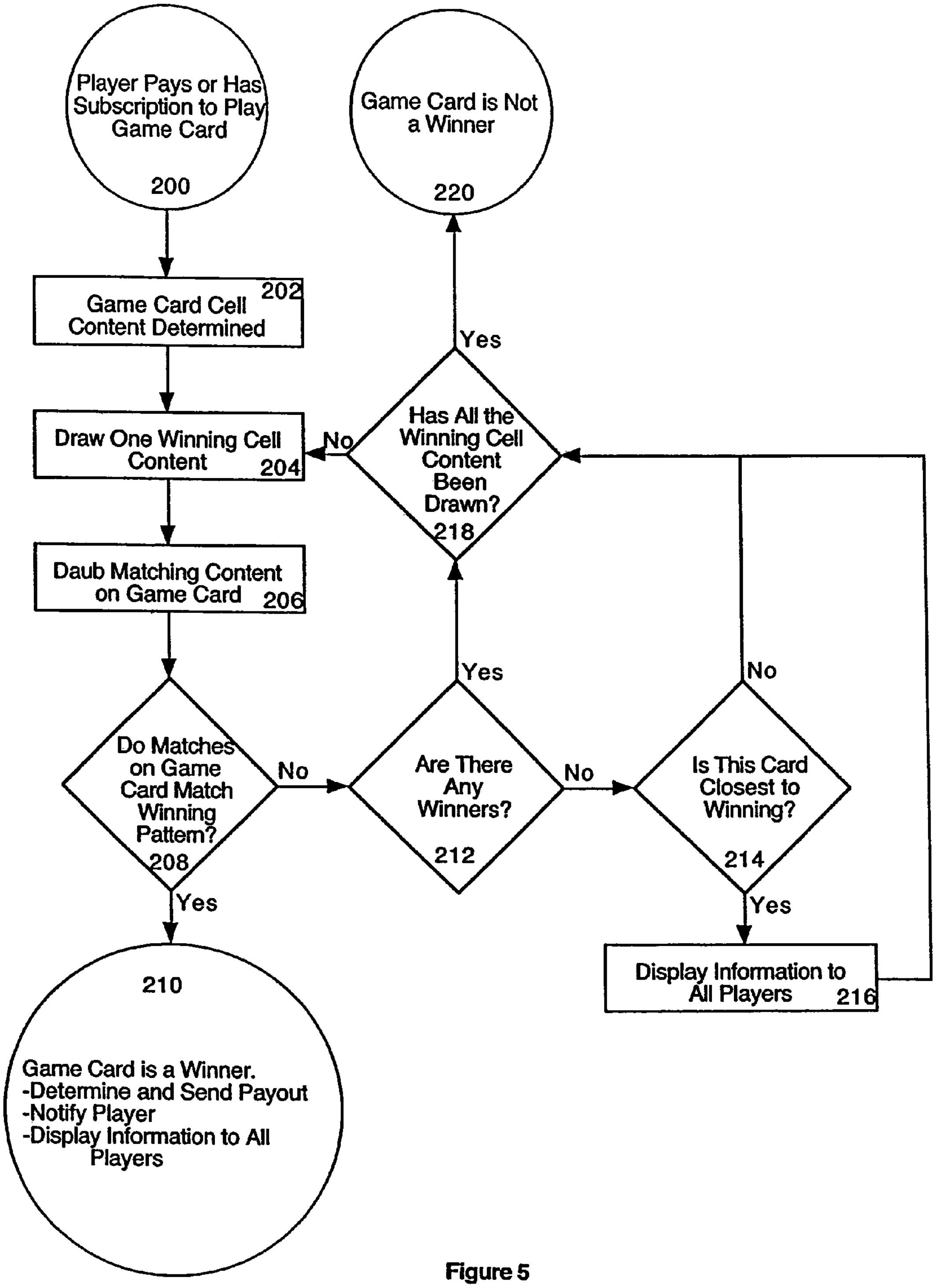
FIG. 5 is a diagram showing a flow chart of a process for playing a game card according to one embodiment of the invention.
Figure 6:
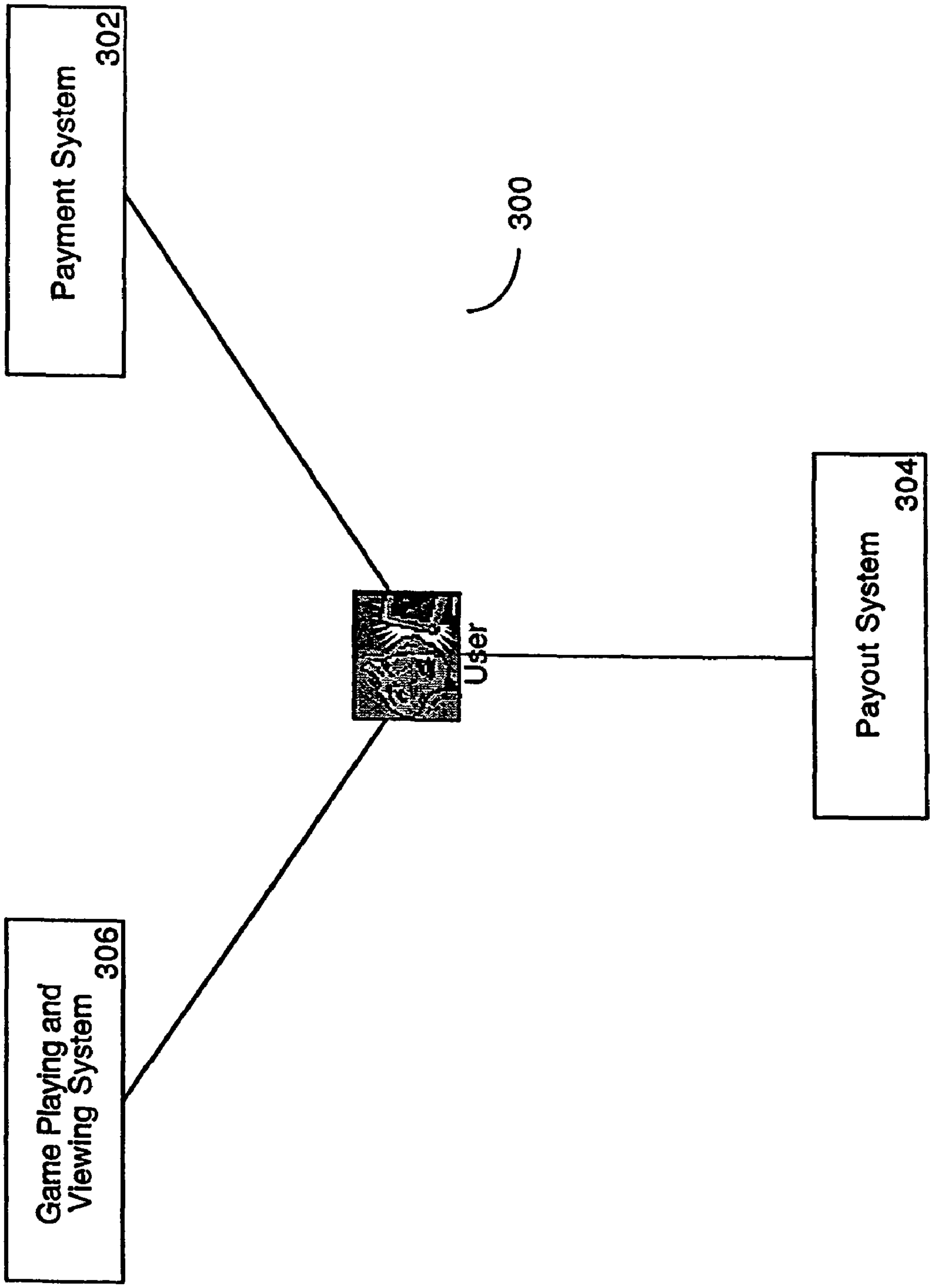
FIG. 6 is a diagram showing components of the game computer system according to one embodiment of the invention.
Figure 7:
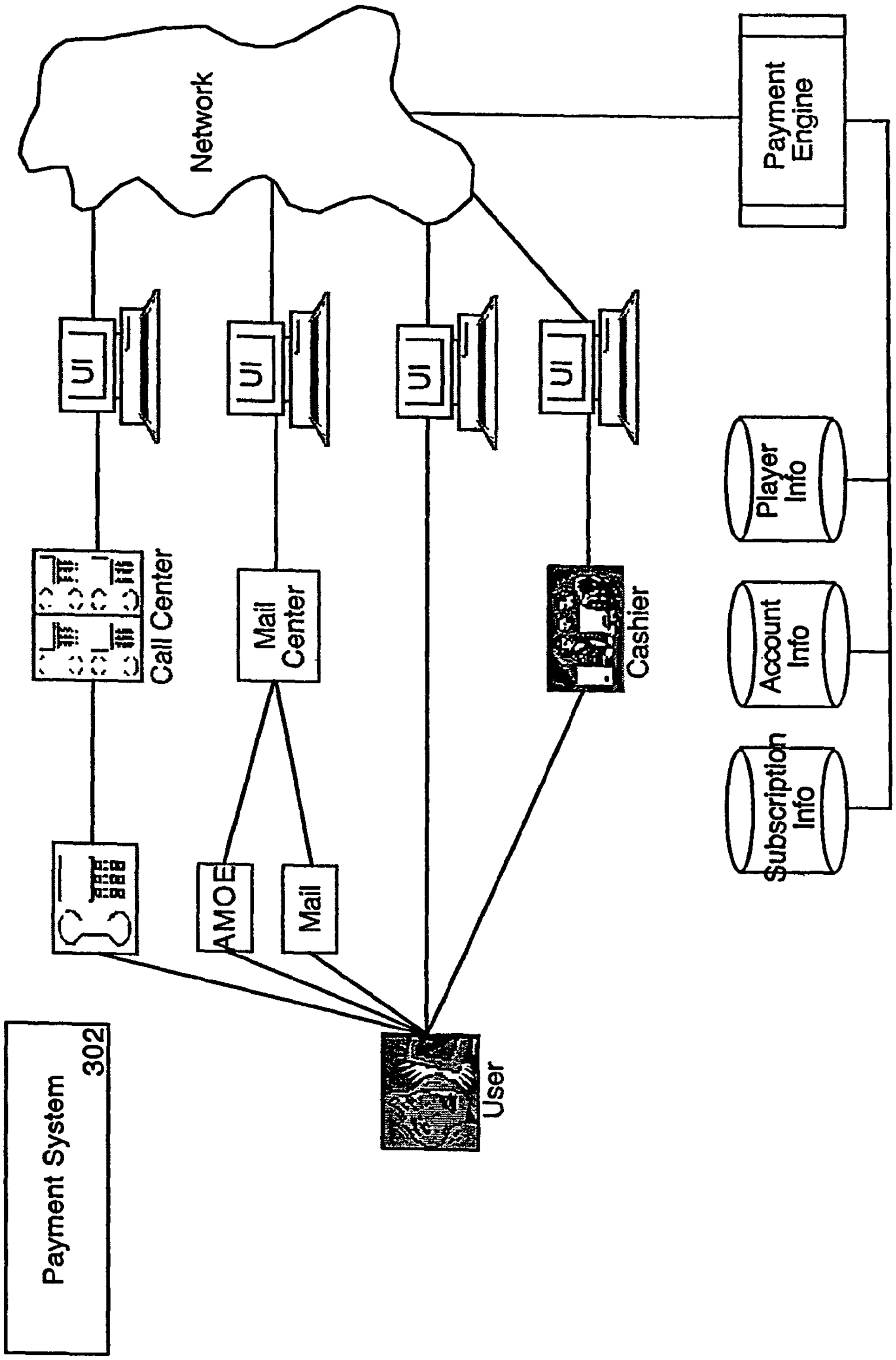
FIG. 7 is a diagram showing components of a game payment subsystem according to one embodiment of the invention.
Figure 8:
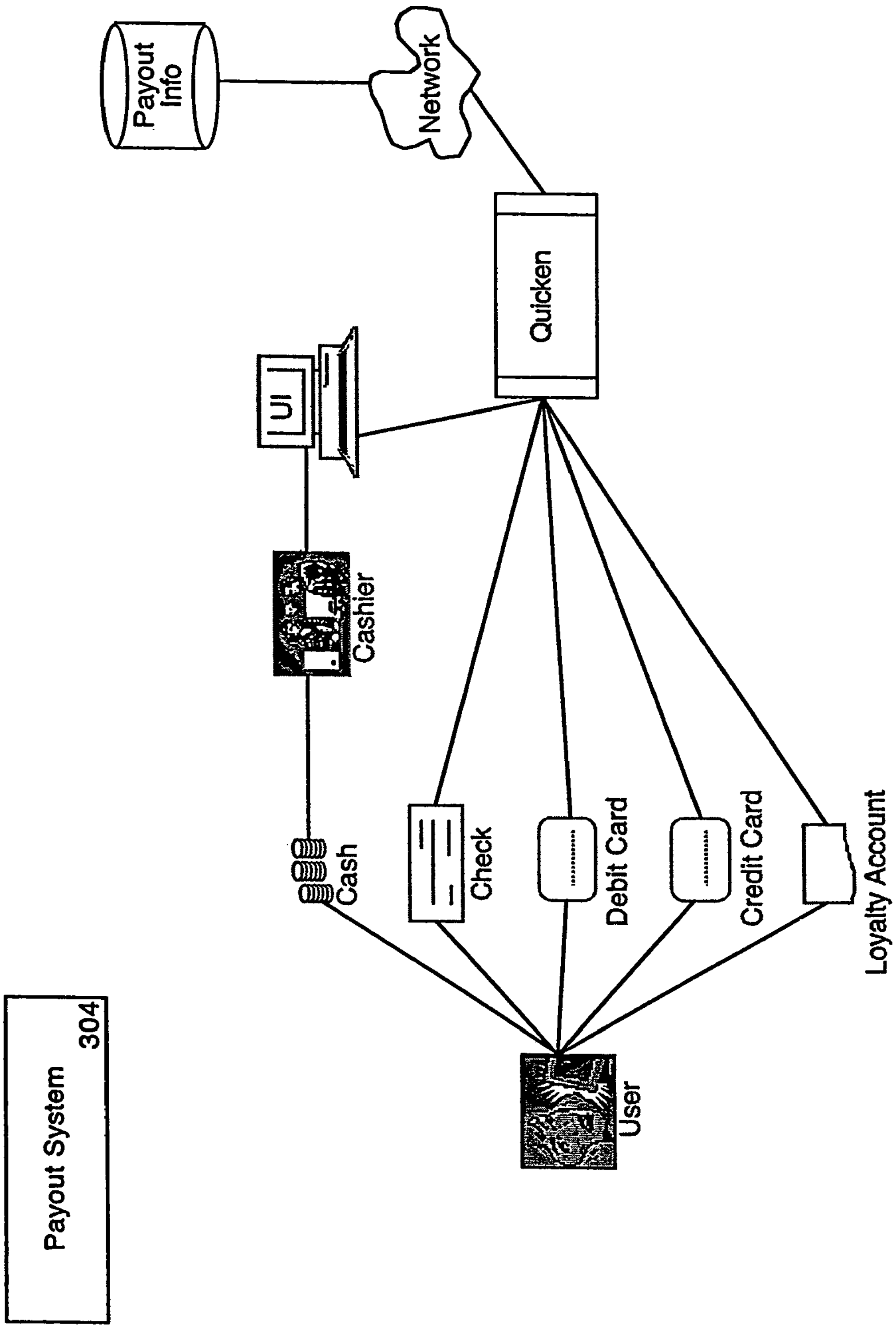
FIG. 8 is a diagram showing components of a game payout subsystem according to one embodiment of the invention.
Figure 9:
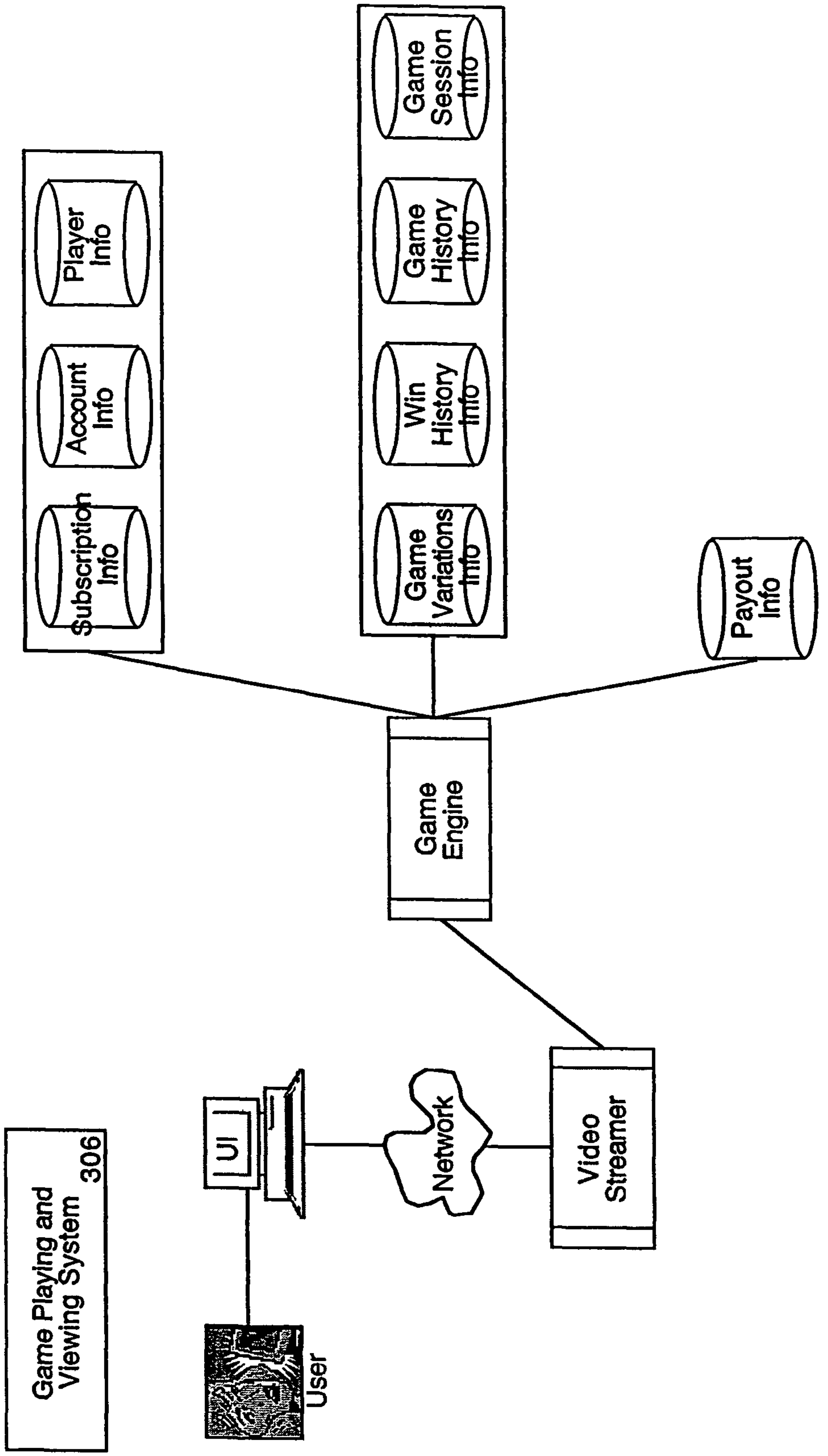
FIG. 9 is a diagram showing components of a game playing and viewing subsystem according to one embodiment of the invention.

The game playing and viewing system may also include a game engine. A game engine may perform, for example, functions according to process 222 as shown in FIG. 5. Referring to FIG. 5, a game session may proceed for a player (e.g., player 120) with a game piece (e.g., game piece 118) having a game card (e.g., game card 100). At block 200, the player pays for a game piece in the game session. At block 202, the computer chooses a game piece having one game card and the card cell content. At block 204, the computer draws the first winning cell content. The computer then checks the game card for a match and daubs the matching cell content, if necessary (at block 206). At block 208, the computer then checks the game card daubed cells to determine if the card matches the predetermined winning pattern. If the card is not a winner, the computer may proceed to draw another winning cell content (204) and continue the cycle until the predetermined number of winning cell content has been drawn or until a winner is found. When all the winning cell content has been drawn at 218 and the game card is not a winner, then the computer may notify the player that the card is not a winner, invite the player to play again or any number of actions.

If the card is a winner at 208, then the computer may proceed to notify the player that he or she is a winner as well as possibly determine the payout amount and also notifying the player of the payout amount (e.g., in a game play interface, e-mail, etc.).

The computer may also display the winning game card and/or player information to all the game players. Winning player information that may be displayed may include name, city, state and country and/or any other identifying information. If multiple winners occur simultaneously, all winners or winning game cards may be displayed at one time or sequentially. It may also be possible that winners or winning game cards may be selectively displayed to particular game players. For instance, if numerous winners occur at one time, a player in Bismarck, N. Dak. may be shown only the winning player information or game card that occurred closest to him or her, say in Pierre, S. Dak. versus some other location (e.g., Boston, Mass.).

After a game card is found not to be a winner, the computer may also determine whether the card is the closest to winning if there have been no winners (at block 214). Any of a number of criteria may be used for determining the card closest to winning. For example, a computer may determine that a card is the closest to winning based upon having the highest number of matching cell content or the least number of cells to match to make the winning pattern. A card determined to be closest to winning may then be displayed to all game players.

It should be appreciated that game play process 222 may include more or less acts as shown in FIG. 5, and that the invention is not limited to any particular number of order of acts. (e.g., the order illustrated in FIG. 5) as the acts may be performed in other orders, may include additional acts and one or more of the acts of process 222 may be performed in series or in parallel to one or more other acts, or parts thereof. For example, acts 208 and 212, or parts thereof, may be performed in parallel, and act 214 may be performed at any point during performance of process 222.

Process 222 is merely an illustrative embodiment of a method for performing game play using a game engine. Such an illustrative embodiment is not intended to limit the scope of the invention, as any of numerous other implementations for performing game play using a game engine. None of the claims set forth below are intended to be limited to any particular implementation of a method of game play for a game engine, unless such claim includes a limitation explicitly reciting a particular implementation.

Process 222, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 10, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the game playing and viewing system may include a software component (e.g., a driver) that streams video via a broadband, satellite or wireless medium to a user interface. If the game is played completely automatically, the user interface may be merely a video terminal including television with no user input means. Viewing access may be controlled by standard methods for conditional access including using set top box addresses, telephone numbers or internet protocol (IP) addresses.

The above is merely an illustrative embodiment of a game playing and viewing system. Such an illustrative embodiment is not intended to limit the scope of the invention, as any of numerous other implementations of a game playing and viewing system, for example, variations of conditional access, are possible and are intended to fall within the scope of the invention. None of the claims set forth below are intended to be limited to any particular implementation of a game playing and viewing system unless such claim includes a limitation explicitly reciting a particular implementation.

System 300, and components thereof such as the payment, payout and game engines, may be implemented using software (e.g., C, C#, C++, Java, or a combination thereof), hardware (e.g., one or more application-specific integrated circuits, processors or other hardware), firmware (e.g., electrically-programmed memory) or any combination thereof. One or more of the components of 300 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 300, each of the components may reside in one or more locations on the system. For example, different portions of the components of 300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 300 may be implemented on a computer system described below in relation to FIGS. 10 and 11.

System 300 is merely an illustrative embodiment of the game system. Such an illustrative embodiment is not intended to limit the scope of the invention, as any of numerous other implementations of the game system, for example, variations of 300, are possible and are intended to fall within the scope of the invention. For example, a parallel system for viewing by interactive television may include one or more additional video streamers specific for interactive television. None of the claims set forth below are intended to be limited to any particular implementation of the game system unless such claim includes a limitation explicitly reciting a particular implementation.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described game functions including but not limited to player subscription or payment, game piece or card selection, drawing winning cell content, daubing matching cell content on game cards, determining winners and paying winners. It should be appreciated that the system may perform other functions, including network communication, and the invention is not limited to having any particular function or set of functions.

Figure 10:
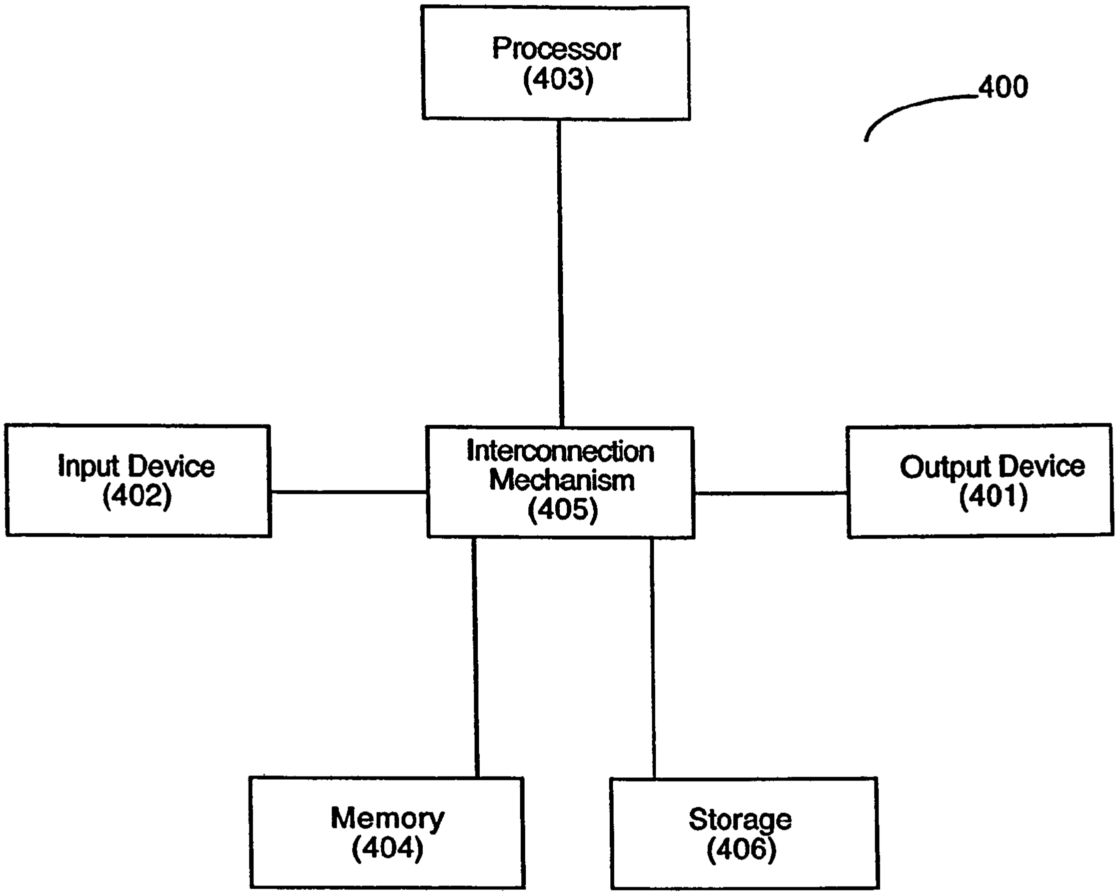
FIG. 10 is a block diagram of a general-purpose computer system upon which various embodiments of the invention may be implemented.

For example, various aspects of the invention may be implemented as specialized software executing in a general-purpose computer system 400 such as that shown in FIG. 10. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, speaker. In addition, computer system 400 may contain one or more interfaces (not shown) that connect computer system 400 to a communication network (in addition or as an alternative to the interconnection mechanism 405.

Figure 11:
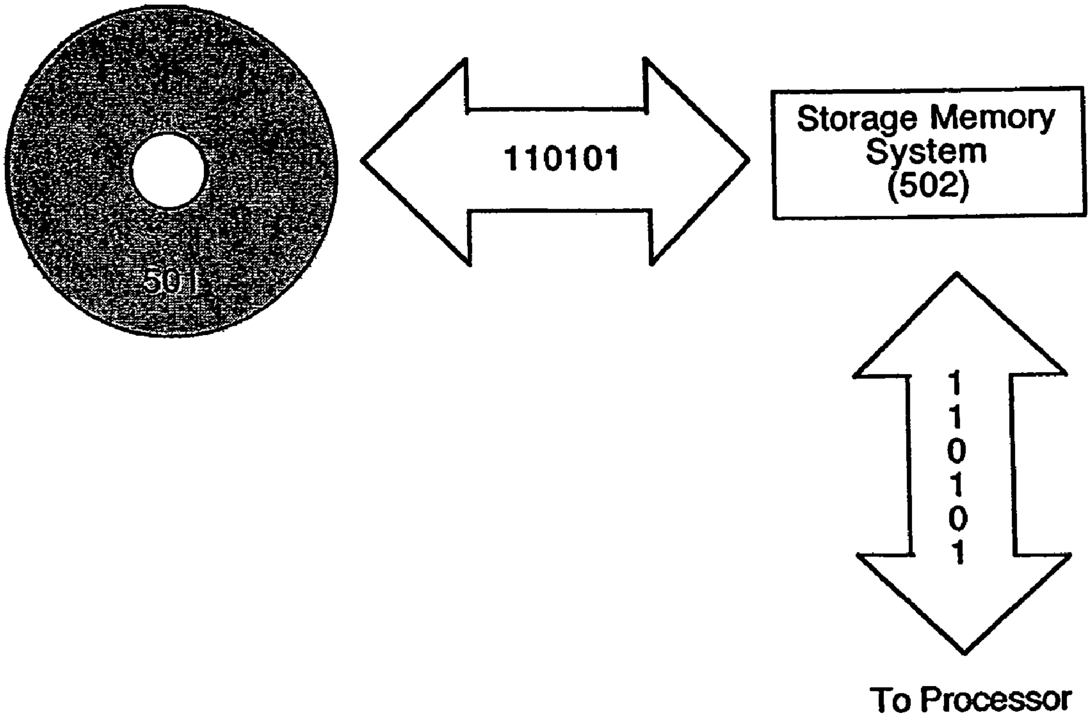
FIG. 11 is a block diagram of a computer data storage system with which various embodiments of the invention may be practiced.

The storage system 406, shown in greater detail in FIG. 11, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 10. Various aspects of the invention may be practiced on one or more computers having a different architecture or components that that shown in FIG. 10.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for conducting a tournament-style game by a game operator using a computer system including a processor coupled to a computer-readable medium, the method comprising acts of:

providing, by the processor to at least one first player, a paid method of entry into a session of the tournament-style game, the paid method of entry requiring at least one of payment and previous game play;

receiving, by the processor from the at least one first player, a first entry into the session of the tournament-style game via the paid method of entry;

recording, by the processor, the first entry on the computer-readable medium;

providing, by the processor to at least one second player, an alternative method of entry (AMOE) into the session of the tournament-style game, the AMOE requiring neither payment, previous game play, previous payment, or previous wagering or gambling, such that no existing or previous relationship with the game operator is necessary, and being accessible via a free Internet website that allows the at least one second player to determine the session from a plurality of specific game sessions to which AMOE entries are assigned; and receiving, by the processor from the at least one second player, a second entry into the session of the tournament-style game via the AMOE; and recording, by the processor, the second entry on the computer-readable medium allowing, by the processor, the at least one player and the at least one second player to compete, within the session, for at least one prize pool funded by entry fees.

2. The method according to claim 1, wherein the tournament-style game is a wagering game of skill.

3. The method according to claim 2, wherein the wagering game of skill is one of poker, blackjack, dominoes, bridge, and mahjongg.

4. The method according to claim 1, wherein the tournament-style game has fixed odds of winning the tournament-style game.

5. The method according to claim 1, wherein the tournament-style game has non-fixed odds of winning the tournament-style game.

6. The method according to claim 1, further comprising an act of conducting the tournament-style game over a communication network.

7. The method according to claim 1, wherein the act of recording the second entry includes an act of entering the at least one second player in a game session following a processing of an entry request of the at least one second player by the AMOE.

8. The method according to claim 1, further comprising an act of providing to the at least one second player an indication of a game session to be entered by the AMOE.

9. The method according to claim 1, wherein the act of providing, to the at least one second player, the AMOE includes providing for an entry of the at least one second player in at least two game sessions.

10. The method according to claim 1, wherein the AMOE is performed by an act of submitting an entry to the tournament-style game by mail.

11. The method according to claim 1, wherein the AMOE is performed by an act of submitting an entry to the tournament-style game over the Internet.

12. The method according to claim 1, wherein a fee representing an entry fee for the second entry is taken from either the total purse or the game operator's purse.

13. The method according to claim 12, wherein a winner's purse is reduced due to the second entry.

14. The method according to claim 1, wherein a fee representing an entry fee for the second entry is paid with no moneys or goods being exchanged.

15. A non-transitory computer-readable medium having computer-readable instructions stored thereon that, as a result of being executed by a computer, instruct the computer to perform a method for conducting a WORLD SERIES OF POKER (WSOP) game, the method comprising acts of:

providing, to at least one first player, a paid method of entry into the WSOP game, the paid method of entry requiring at least one of payment and previous game play;

providing, to at least one second player, an alternative method of entry (AMOE) to the WSOP game, the AMOE requiring neither payment, previous game play, previous payment, or previous wagering or gambling, such that no existing or previous relationship with the game operator is necessary, and being accessible via a free Internet website that allows the at least one second player to determine the session from a plurality of specific game sessions to which AMOE entries are assigned; and providing, the second entry into the session via the AMOE, to the at least one second player; and providing for the first player and the second player to compete for at least one prize pool funded by entry fees.

16. The computer-readable medium according to claim 15, wherein the method further comprises an act of conducting the WSOP game over a communication network.

17. The computer-readable medium according to claim 15, wherein the act of providing, to the at least one second player, the AMOE includes an act of entering the at least one second player in a WSOP game session following a processing of an entry request of the at least one player by the AMOE.

18. The computer-readable medium according to claim 15, wherein the method further comprises an act of providing to the at least one second player an indication of a WSOP game session to be entered by the AMOE.

19. The computer-readable medium according to claim 15, wherein the AMOE includes an entry of the at least one second player in at least two WSOP game sessions.

20. The computer-readable medium according to claim 15, wherein the AMOE includes implementing a method comprising acts of:

entering the at least one second player into a game;

identifying the at least one second player as a winner of the game; and entering the winner of the game into the WSOP game.

21. The computer-readable medium according to claim 15, wherein the game is a game of chance.

* * * * *